US010578124B2

(12) United States Patent
Zeng et al.

(10) Patent No.: US 10,578,124 B2
(45) Date of Patent: *Mar. 3, 2020

(54) SYSTEMS AND METHOD FOR A VARIABLE INLET DEVICE OF A COMPRESSOR

(71) Applicant: Ford Global Technologies, LLC, Dearborn, MI (US)

(72) Inventors: Tao Zeng, Bloomfield Hills, MI (US); Leon Hu, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 236 days.

This patent is subject to a terminal disclaimer.

(21) Appl. No.: 15/701,050

(22) Filed: Sep. 11, 2017

(65) Prior Publication Data

US 2019/0078586 A1 Mar. 14, 2019

(51) Int. Cl.
*F04D 29/46* (2006.01)
*F04D 27/02* (2006.01)
*F02B 37/24* (2006.01)
*F04D 29/68* (2006.01)
*F02B 37/12* (2006.01)

(52) U.S. Cl.
CPC .......... *F04D 29/462* (2013.01); *F02B 37/24* (2013.01); *F04D 27/0215* (2013.01); *F04D 27/0246* (2013.01); *F04D 27/0253* (2013.01); *F04D 29/681* (2013.01); *F02B 2037/125* (2013.01); *F05D 2220/40* (2013.01); *F05D 2250/51* (2013.01)

(58) Field of Classification Search
CPC ............... F02B 37/24; F02B 2037/125; F04D 27/0215; F04D 27/0246; F04D 29/462; F04D 29/681; F04D 27/002; F04D 29/4206; F04D 29/464; F05D 2220/40; F05D 2250/51

See application file for complete search history.

(56) References Cited

U.S. PATENT DOCUMENTS 4,856,962 A 8/1989 McDow
4,930,979 A 6/1990 Fisher et al.
(Continued)

FOREIGN PATENT DOCUMENTS

EP 2017434 A2 1/2009
WO 2007079137 A2 7/2007

OTHER PUBLICATIONS

Zeng, Tao et al., "Systems and Method for a Variable Inlet Device of a Compressor," U.S. Appl. No. 15/700,995, filed Sep. 11, 2017, 67 pages.

*Primary Examiner* — Jesse S Bogue
(74) *Attorney, Agent, or Firm* — Geoffrey Brumbaugh; McCoy Russell LLP

(57) ABSTRACT

Methods and systems are provided for a variable inlet device of a compressor. In one example, a compressor may include an impeller rotatable about a central axis and an inlet conduit including a variable inlet device (VID) positioned upstream of the impeller and adjustable between and open position and a closed position that restricts and generates pre-swirl flow to the impeller. The VID may include a plurality of adjacently arranged blades forming a ring around the central axis with inner surfaces of the blades forming a flow passage through the VID, each of the blades being pivotable, about an axis arranged tangent to the ring, between the open and closed position.

14 Claims, 9 Drawing Sheets

(56) References Cited

U.S. PATENT DOCUMENTS

| | | | |
|---|---|---|---|
| 7,083,379 B2* | 8/2006 | Nikpour | F04D 27/0246 |
| | | | 415/144 |
| 8,210,793 B2* | 7/2012 | Hale | F02C 1/005 |
| | | | 415/151 |
| 8,517,664 B2* | 8/2013 | Sun | F02B 47/08 |
| | | | 415/126 |
| 8,690,524 B2 | 5/2014 | Yin et al. | |
| 9,200,640 B2* | 12/2015 | Patil | F04D 27/0246 |
| 9,518,505 B2* | 12/2016 | Matthews | F02B 37/00 |
| 9,777,737 B2* | 10/2017 | Houst | F02B 37/22 |
| 2010/0172745 A1 | 7/2010 | Hodder | |
| 2011/0173975 A1* | 7/2011 | Sun | F02B 47/08 |
| | | | 60/605.2 |
| 2012/0263586 A1 | 10/2012 | Patil | |
| 2014/0308110 A1* | 10/2014 | Houst | F02B 37/22 |
| | | | 415/1 |
| 2014/0363269 A1* | 12/2014 | Takeda | F04D 27/0246 |
| | | | 415/1 |
| 2014/0377051 A1 | 12/2014 | Sun et al. | |
| 2016/0003046 A1* | 1/2016 | Smith | F04D 29/4213 |
| | | | 417/406 |
| 2016/0131145 A1* | 5/2016 | Mohtar | F01D 17/141 |
| | | | 417/380 |
| 2016/0160756 A1 | 6/2016 | McGahey et al. | |
| 2017/0074291 A1 | 3/2017 | Karim et al. | |
| 2018/0202559 A1* | 7/2018 | Freeman, III | F02M 35/10262 |

\* cited by examiner

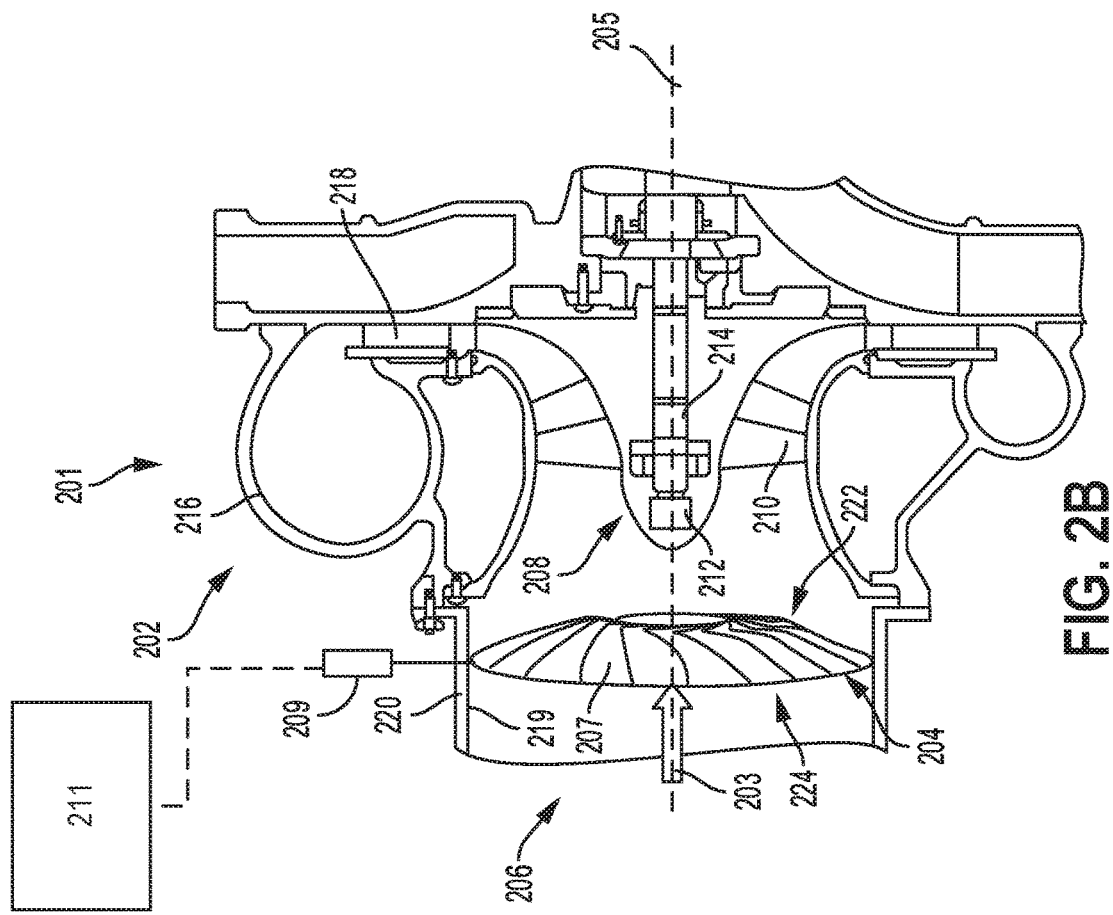
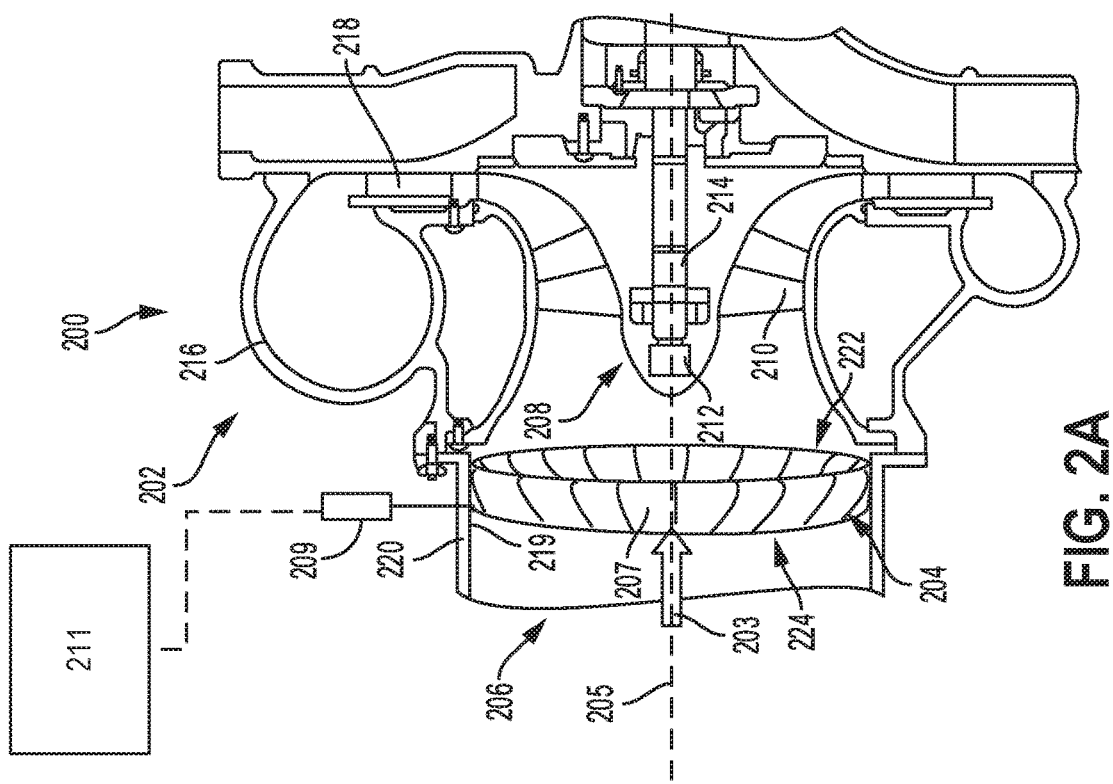
FIG. 2A
FIG. 2B

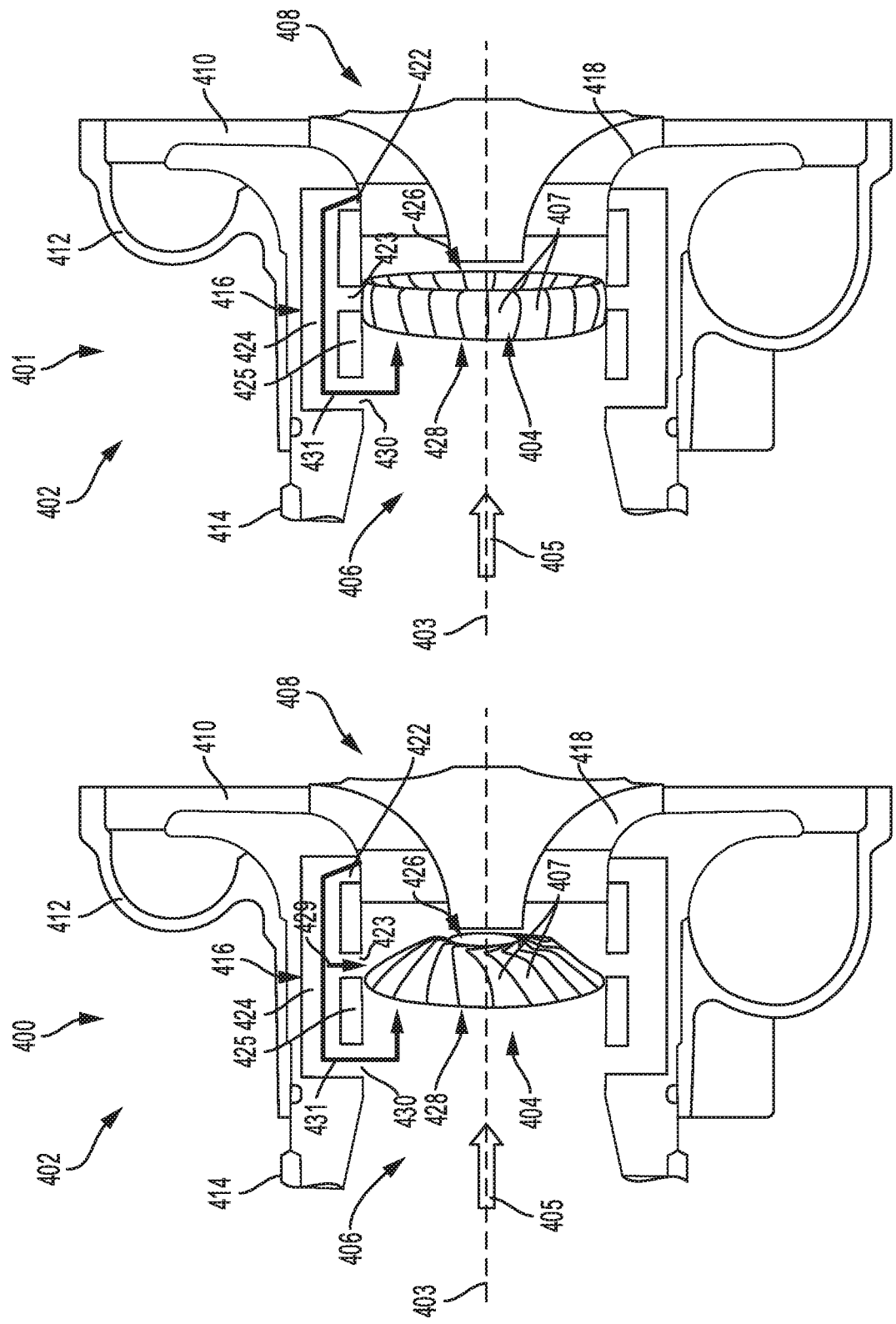

SYSTEMS AND METHOD FOR A VARIABLE INLET DEVICE OF A COMPRESSOR

FIELD

The present description relates generally to methods and systems for a variable inlet device of a compressor and controlling the variable inlet device to adjust airflow entering the compressor.

BACKGROUND/SUMMARY

A turbocharger may be provided in an engine to increase engine torque or power output density. The turbocharger may include an exhaust driven turbine coupled to a compressor via a drive shaft. The compressor may be fluidly coupled to an air intake manifold in the engine connected to a plurality of engine cylinders. Exhaust flow from one or more engine cylinders may be directed to a turbine wheel causing the turbine to rotate about a fixed axis. The rotational motion of the turbine drives an impeller (e.g., wheel) of the compressor which compresses air into the air intake manifold to increase boost pressure based on engine operating conditions.

Compressor efficiency influences overall engine performance and fuel consumption. For example, lower compressor efficiency may result in slow engine transient response and higher fuel consumption for both steady-state and transient engine operation. At lighter engine loads, when compressor efficiency is reduced, increased turbocharger lag may result during a tip-in. Additionally, light load operation may result in lower compressor efficiency and compressor surge limits may restrict boost pressure rise at low engine speeds.

Other attempts to address low compressor efficiency include utilizing a variable inlet compressor that utilize guide vanes to direct and adjust flow through an impeller of the compressor. One example approach is shown by Sconfietti et al in EP2024645. Therein, a variable inlet device disposed adjacent the compressor inlet and including a plurality of vanes is disclosed. Each of the vanes is movable between a first position and a second position to control the quantity of fluid that passes to the impeller. Specifically, the vanes are positioned about a center of a wheel device and pivot about an axis parallel with a central axis of the compressor. In a closed position, flow is blocked from passing to the impeller and in an open position, gas may flow between adjacent blades, around the center of the wheel device.

However, the inventors herein have recognized potential issues with such systems. As one example, even in the open position, due to the orientation and pivoting direction of these vanes, flow through the variable inlet device and to the impeller is restricted (e.g., partially blocked). As a result, this type of variable inlet has reduced high end efficiency and constrains the high end flow with flow restricting issues. Further, this type of device does not generate pre-swirl flow for the compressor which may increase compressor low-end efficiency.

In one example, the issues described above may be addressed by a compressor, comprising: an impeller rotatable about a central axis; and an inlet conduit including a variable inlet device (VID) positioned therein, upstream of the impeller, and including a plurality of adjacently arranged blades forming a ring around the central axis with inner surfaces of the blades forming a flow passage through the VID, each of the blades being pivotable, about an axis arranged tangent to the ring, between an open and closed position. In the open position, the blades may have little to no overlapping with one another and the inner surfaces form a wider flow passage with reduced flow restriction. In the closed position, the blades may have increased overlapping with one another at an outlet end of the VID, thereby restricting flow as it passes through the flow passage of the VID. Further, the overlapping of the blades creates a smooth surface with spiral grooves that generates pre-swirl flow to the impeller as intake air flows through the flow passage of the VID. As a result, compressor efficiency is increased in the closed position due to the restricted, pre-swirl flow that is generated by the VID. Compressor efficiency is further increased at higher loads when the VID is in the open position due to reduced flow restriction through the inlet conduit and VID. In this way, compressor efficiency and overall engine performance and fuel economy may be increased across a wide range of engine operating speeds and loads.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-2C show a first and second embodiment of a turbocharger compressor including a variable inlet device positioned in an inlet conduit of the compressor.

FIGS. 4A-4B show a cut-away view of a third embodiment of a turbocharger compressor including a casing treatment and a variable inlet device positioned in an inlet conduit of the compressor.

FIGS. 2A-3B and 4A-5B are shown approximately to scale

DETAILED DESCRIPTION

Figure 2C:
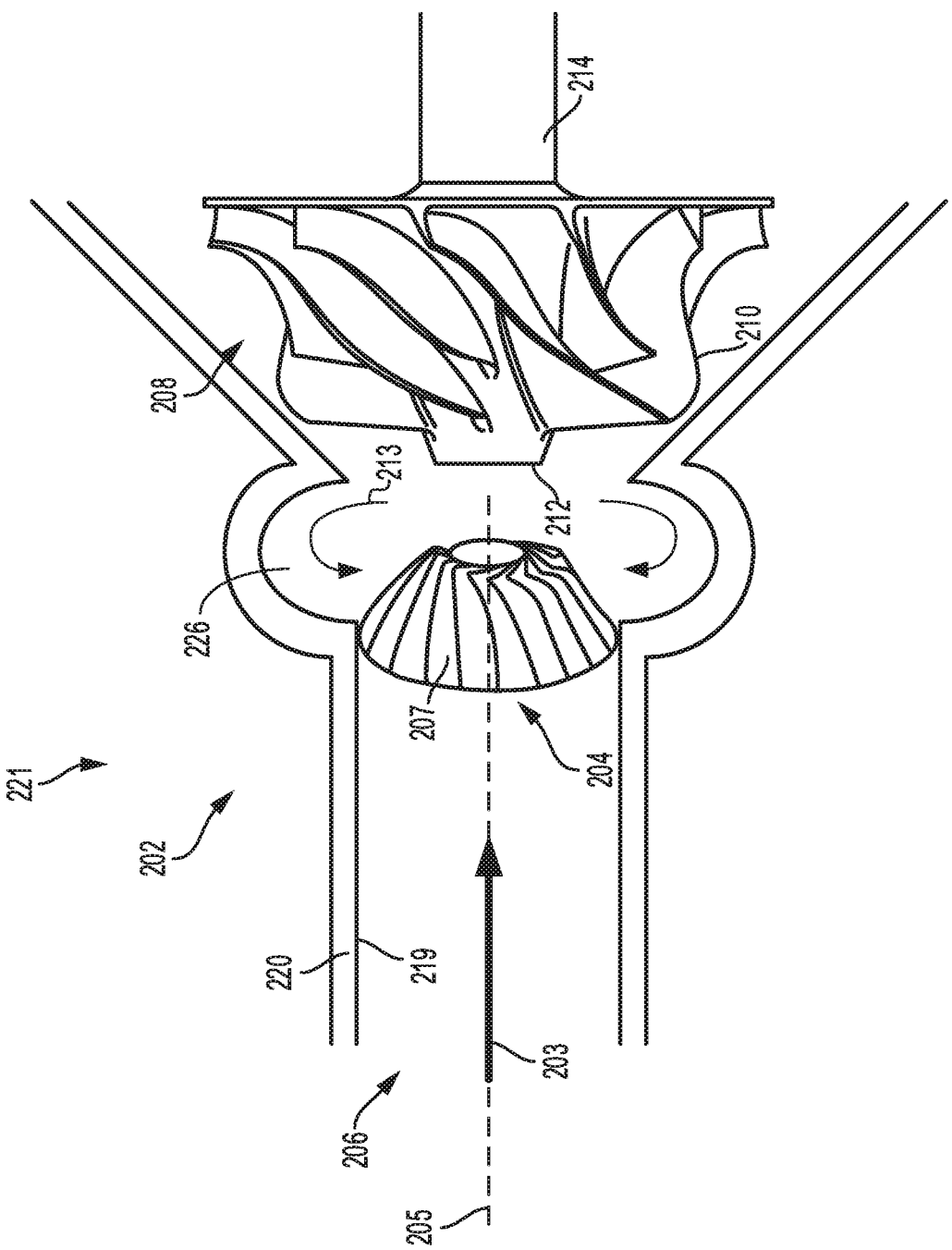
Figure 3A:
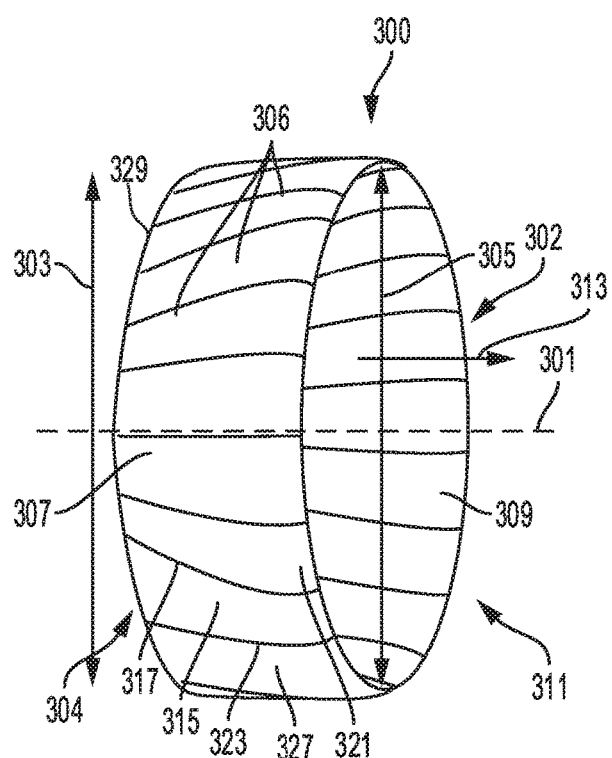
FIGS. 3A-3D show an embodiment of a variable inlet device for a turbocharger compressor in open and closed positions.
Figure 3B:
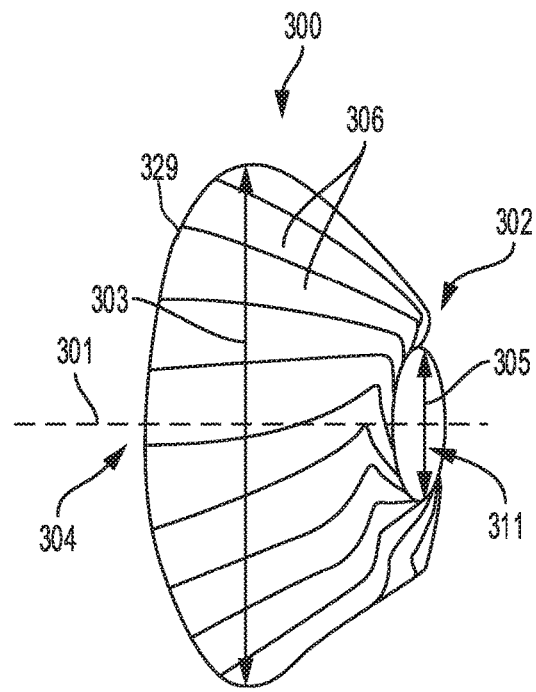
Figure 3C:
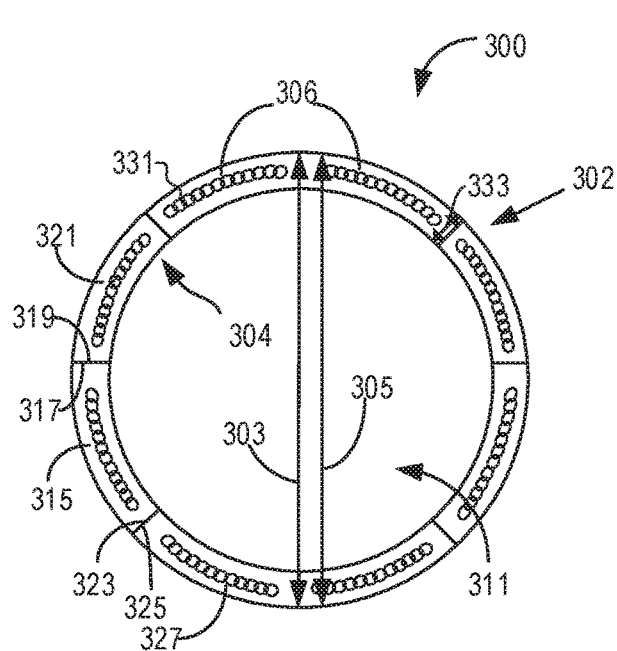
Figure 3D:
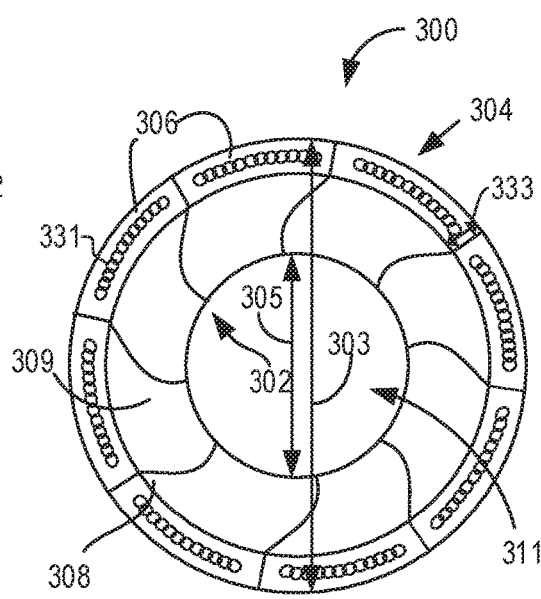
Figure 5A:
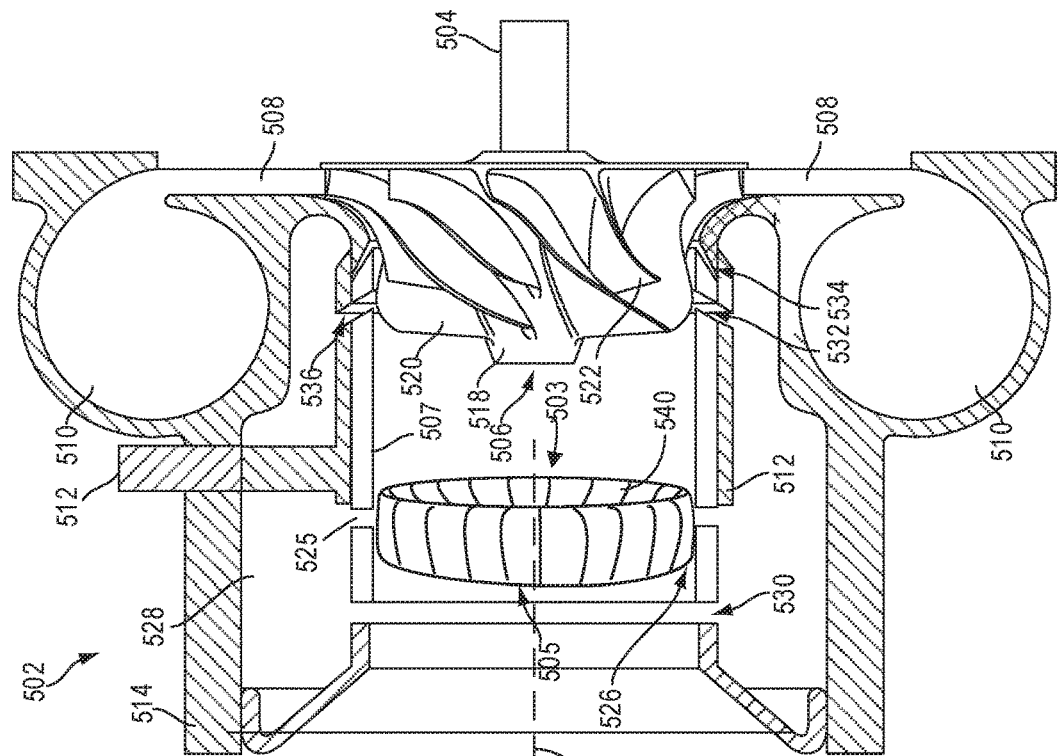
FIGS. 5A-5B show a cut-away view of a fourth embodiment of a turbocharger compressor including an active casing treatment and a variable inlet device positioned in an inlet conduit of the compressor.
Figure 5B:
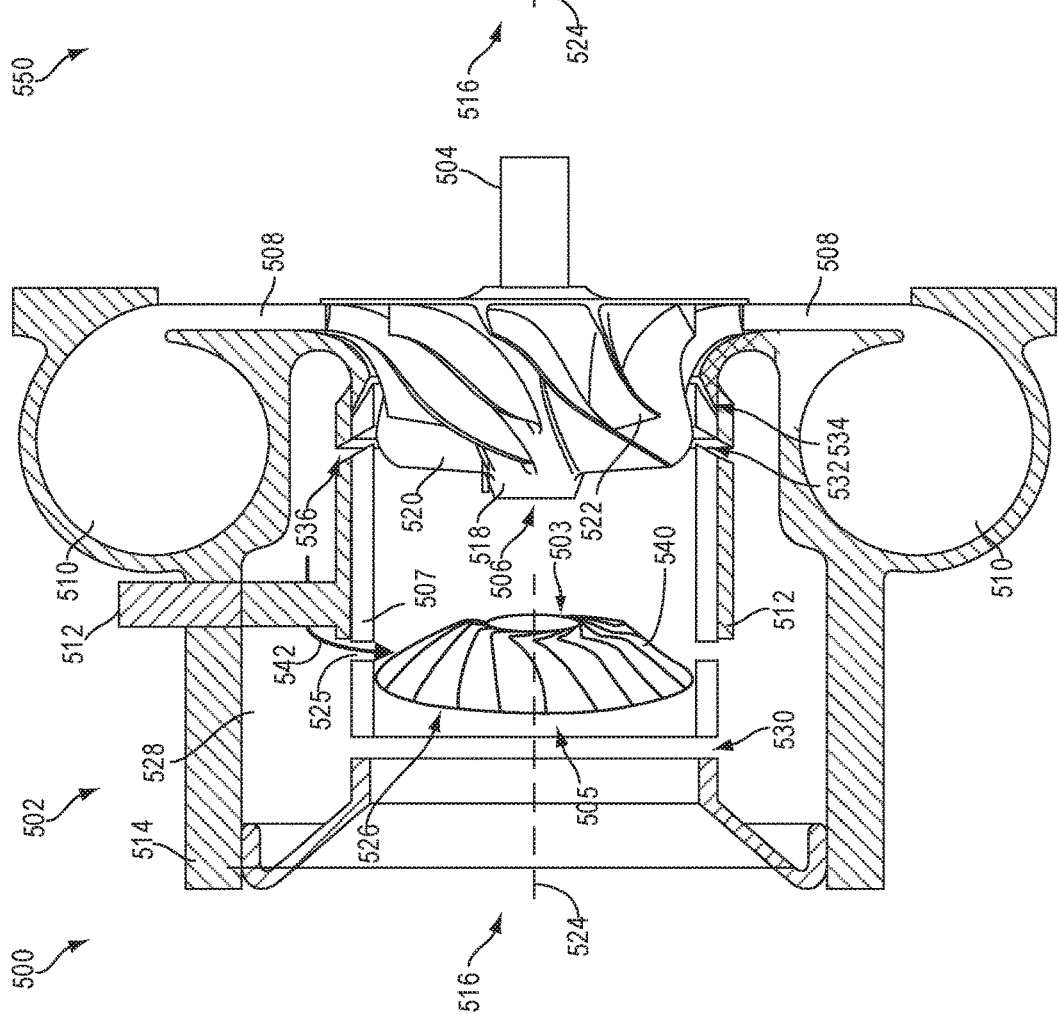
Figure 6:
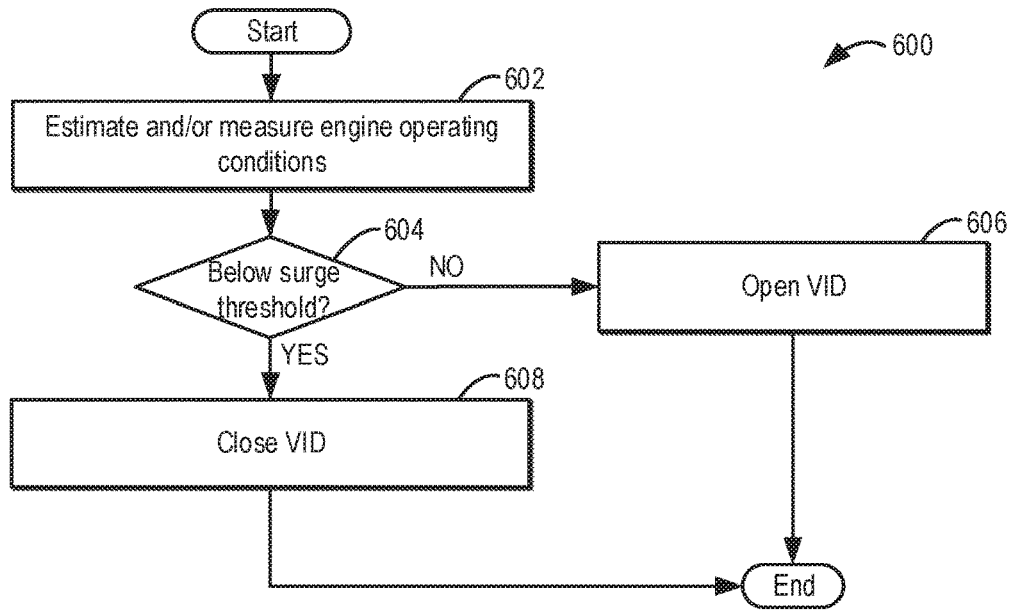
FIG. 6 shows a flow chart of a method for controlling a position of a variable inlet device.
Figure 7:
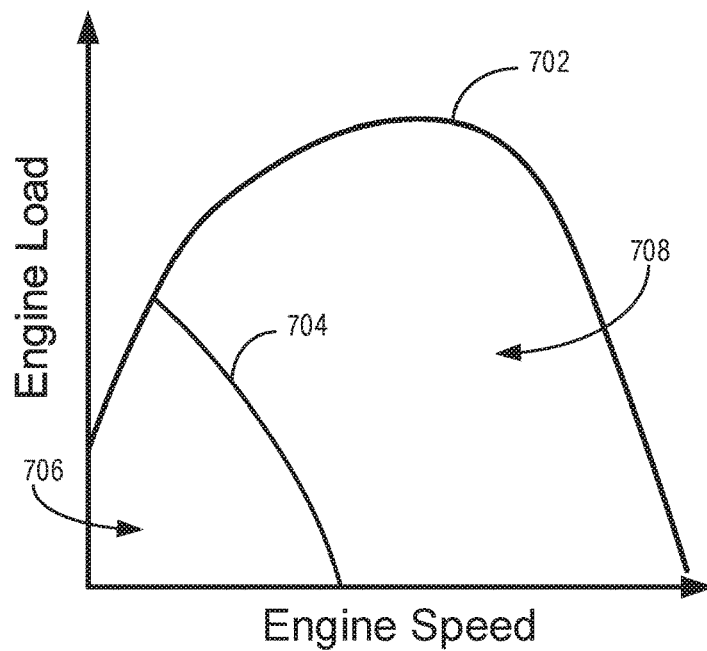
FIG. 7 shows an engine load and engine speed map for controlling a position of a variable inlet device.
Figure 8:
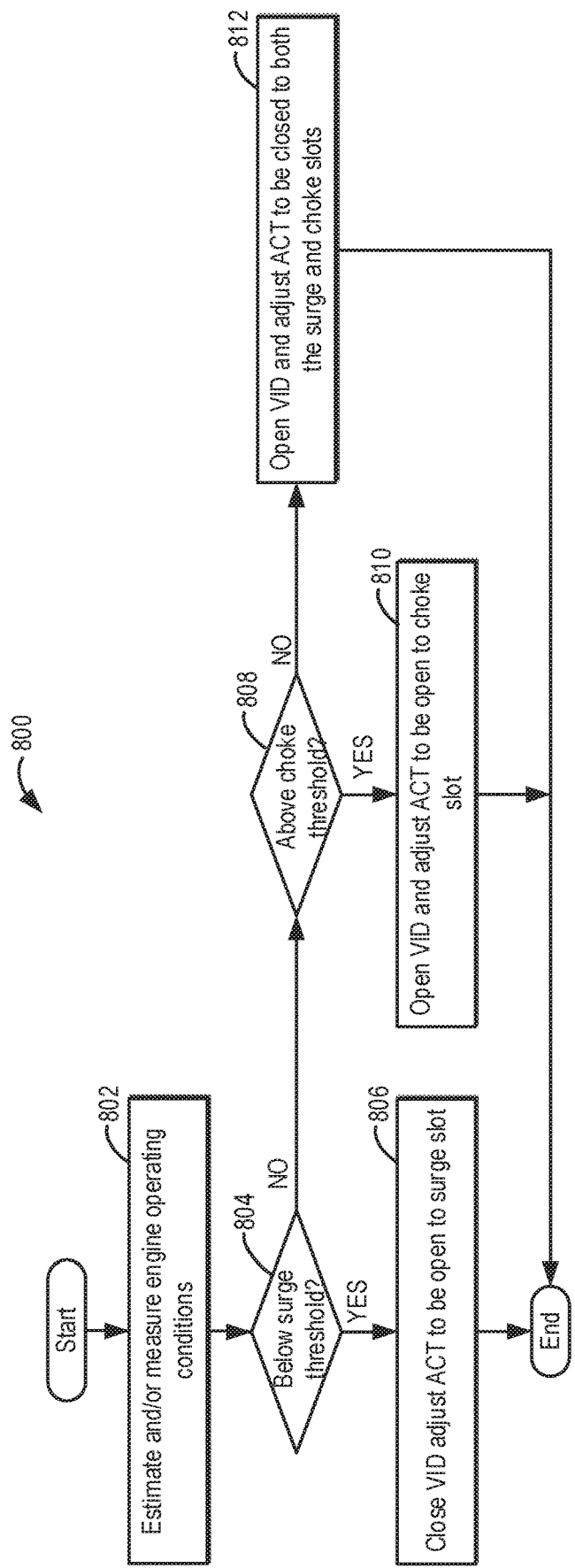
FIG. 8 shows a flow chart of a method for coordinating control of a position of a variable inlet device and an active casing treatment of a compressor.
Figure 9:
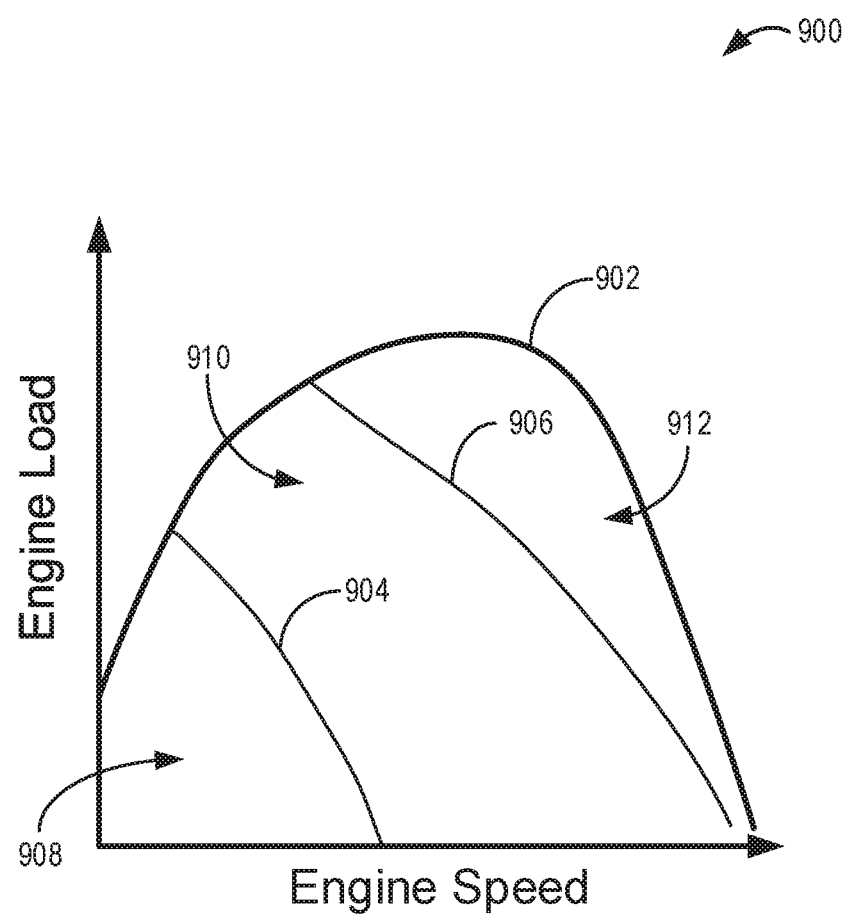
FIG. 9 shows an engine load and engine speed map for controlling a position of a variable inlet device and an active casing treatment of a compressor.

The following description relates to systems and methods for a variable inlet device of a turbocharger compressor. A compressor of a turbocharger, such as the compressor of the engine system shown in FIG. 1, may be positioned in an intake passage of an engine. The compressor may include an outer casing with an inlet conduit (e.g., intake passage) and an impeller (e.g., compressor wheel) disposed downstream in the inlet conduit. The impeller may include one or more blades and is rotatable about a central axis of the compressor. As shown in FIGS. 2A-2C, a variable inlet device (VID) may be disposed within the inlet conduit of the compressor, upstream of the impeller. The VID may be adjustable between an open position (as shown in FIGS. 2A, 2C, 3A, 3C, 4B, and 5B) and a closed position (as shown in FIGS. 2B, 3B, 3D, 4A, and 5A). A passive method of actuation of the VID is illustrated in FIG. 2C. As shown in FIGS. 3A-3B, the VID includes a plurality of adjacently arranged blades forming a ring around the central axis of the compressor. The blades are pivotable, toward and away from the central axis, between the open and closed position. When the VID is in the open position, inner surfaces of the blades of the VID restrict flow through the VID and inlet conduit less than when the VID is in the closed position. For example, as shown in FIG. 3C, in the open positon the amount the VID restricts flow from the inlet end to the outlet end is reduced. Conversely, when the VID is in the closed position, as shown in FIG. 3D, the blades are pivoted so that a flow passage of the VID formed by the inner surfaces of the blades narrows from the inlet end to the outlet end. Additionally, in the closed position, the inner surfaces form a smooth surface with spiral grooves that create swirl flow due to overlapping of the blades at the outlet end. As shown in FIGS. 4A-4B, the VID may also be used in conjunction with a compressor having a casing treatment including a resonance chamber for recirculating flow from the impeller to the inlet conduit, upstream of the VID. Further, as shown in FIGS. 5A-5B, the VID may be used in conjunction with a compressor having an active casing treatment adapted to adjust recirculation flow between a recirculation port and one of a bleed port and injection port disposed in a wall of the inlet conduit. As shown in FIGS. 6-7, the position of the VID may be controlled based on engine load and engine speed conditions relative to a surge threshold. In the embodiment of the VID used in conjunction with an active casing treatment, the position of the VID and the active casing treatment may be controlled, in coordination with one another, according to engine load and engine speed conditions relative to a surge threshold and choke threshold, as depicted in FIGS. 8-9. In this way, a VID for a compressor may be used to increase compressor efficiency at different operating conditions, such as lighter load conditions. The arrangement of the VID may reduce unwanted flow restriction in the open position and generate smooth, pre-swirl flow to the compressor impeller in the closed position, thereby improving low-end efficiency and flow rate of the compressor.

Figure 1:
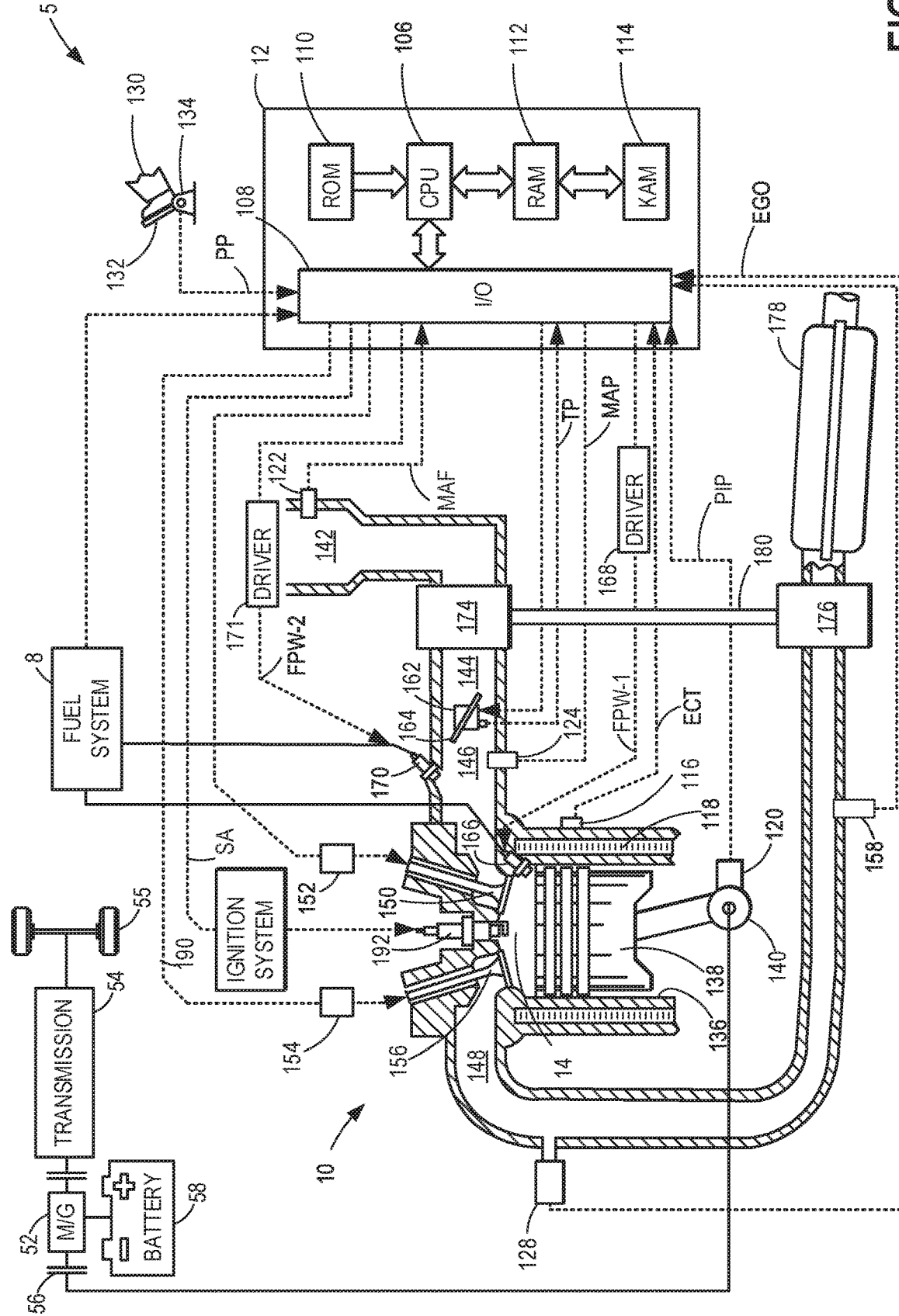
FIG. 1 shows a schematic depiction of an example vehicle system.

Turning now to the figures, FIG. 1 depicts an example embodiment of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in intake passage 146 rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of catalyst 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, upon receiving signals from various sensors, the engine controller may send control signals to an actuator to alter the position of a variable inlet device (VID) of the compressor 174 and/or to an actuator of an active casing treatment (such as a slideable sleeve) arranged along an inlet conduit of the compressor 174 (as explained further below with reference to FIGS. 6 and 8). For example, the controller may send an electronic signal to an actuator of the VID to adjust the VID from an open to a closed position or a closed to an open position in response to a current engine speed and engine load relative to a surge threshold and/or choke threshold of the compressor.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

FIGS. 2A-2B show a cut-away (e.g., cross-sectional) view of a first embodiment of compressor 202 of a turbocharger including a variable inlet device (VID) 204 positioned in an inlet conduit 206 of the compressor 202. In one embodiment, compressor 202 may be compressor 174 of FIG. 1. FIG. 2C shows a second embodiment of VID 204 positioned in the inlet conduit 206 of compressor 202, where compressor 202 includes an additional channel 226 arranged in the inlet conduit 206, upstream of the impeller 208 and downstream of an inlet end of the VID 204, as explained further below. Compressor 202 includes an inlet conduit 206, impeller 208, volute 216, diffuser 218, and casing 220. Elements of compressor 202 may be described in the direction of gas flow 203 through the compressor 202 and any element in the path of gas flow relative to a reference point is considered downstream of the reference point. Conversely any element positioned in the reverse direction of gas flow relative to a reference point is upstream of the reference point. Additionally, the compressor 202 includes a central axis 205 which is a central axis of inlet conduit 206 and a central rotational axis of impeller 208 (e.g., the impeller is rotatable about the central axis 205).

Gas flow (e.g., intake air from an intake passage, such as intake passage 142 shown in FIG. 1) 203 enters inlet conduit 206 and flows through the VID 204, situated upstream of impeller 208. VID 204 includes a plurality of blades 207 arranged adjacent to one another in a ring configuration around central axis 205. The configuration of VID 204 is described further below with reference to FIGS. 3A-3D. The VID 204 is positioned so that a central axis of the ring of blades 207 is perpendicular to the walls of inlet conduit 206 and collinear with central axis 205 of compressor 202. Impeller 208 includes a plurality of impeller blades 210 attached to a hub 212. Hub 212 is connected to a rotatable shaft 214 which is aligned parallel to the direction of gas flow and central axis 205 and is connected to a turbine wheel (which drives rotation of the shaft and impeller 208). The rotation of impeller 208, draws gas into compressor 202 through inlet conduit 206 of casing 220, and then through the VID 204. From VID 204, the gas travels to impeller 208 and into diffuser 218. The gas is accelerated through the diffuser 218 into the volute 216 causing a deceleration of gas flow and an increase in the pressure of volute 216. The high pressure in volute 216 may result in gas flow to the intake manifold.

As shown in FIGS. 2A-2C, the VID 204 spans across an entirety of the inlet conduit 206. Specifically, ends of the blades 207 of VID 204 are positioned proximate to inner walls 219 of casing 220. Additionally, an entirety of VID 204 is positioned upstream of an entirety of impeller 208, including a leading edge of impeller blades 210. As shown in FIGS. 2A-2B, an actuator 209, in electronic communication with a controller 211 (which may be the same as or similar to controller 12 shown in FIG. 1) is mechanically coupled to VID 204. Based on one or more electronic signals received from the controller 211, the actuator 209 is adapted to pivot the blades 207 of VID 204 between open and closed positions. In one example, the actuator may be a motor coupled to the inlet end of VID 204. FIG. 2A shows a first schematic 200 of compressor 202 with VID 204 in an open position with outlet blade ends 222 of blades 207, which are arranged furthest downstream in the inlet conduit 206 relative to inlet blade ends 224 of blades 207, arranged proximate to the inner walls 219 of inlet conduit 206. In one example, the outlet blade ends 222 may contact (e.g., have face-sharing contact with) inner walls 219. In the open position, a diameter of the ring formed by the outlet blade ends 222 may be equal to or greater than the diameter of the ring formed by the inlet blade ends 224. In the open position, inner walls of the blades 207 create little to no flow restriction through VID 204 and, thus, inlet conduit 206. FIG. 2B shows a second schematic 201 of compressor 202 with VID 204 in a closed position with the inlet blade ends 224 arranged proximate to the inner walls 219 of inlet conduit 206. In one example, the inlet blade ends 224 may contact (e.g., have face-sharing contact with) inner walls 219. In the closed position, the diameter of the ring formed by the outlet blade ends 222 is narrower than the diameter of the ring formed by the inlet blade ends 224. Thus, gas flow through the VID 204 and inlet conduit 206 (and to the impeller 208) is restricted by the inner surfaces of the blades 207 when the VID is in the closed position shown in FIG. 2B.

FIG. 2C shows a third schematic 221 of compressor 202 illustrating a passive actuation mechanism for adjusting VID 204 between open and closed positions. Specifically, the casing 220 includes an additional channel 226 formed in the inlet conduit 206, upstream of the impeller 208 and downstream of the inlet end of VID 204. As shown in FIG. 2C, the channel 226 may extend outward from central axis 205 such that the inner walls 219 in the region of channel 226 are positioned further away from the central axis 205 than the inner walls 219 in a region of the inlet conduit 206 arranged upstream of the inlet end of VID 204. During certain operating conditions, gas flow recirculates from impeller 208 to VID 204, in a direction opposite of gas flow 203 into inlet conduit 206, via channel 226, as shown at arrow 213. This recirculated gas flow via channel 226 causes a higher pressure to be experienced on the outer faces (e.g. the surfaces that face the inner walls 219 of inlet conduit 206) of blades 207 at the outlet end of VID 204 than the pressure experienced by the inner faces of blades 207 due to gas flow 203. As a result, the VID 204 is passively actuated, via this pressure differential, from the open position to the closed position (as shown in FIG. 2C). One example of such a pressure differential may occur during surge conditions where the pressure at the outlet end of compressor 202 increases and initiates a reversal in gas flow 203 via channel 226. The increased pressure on the outer faces of blades 207 at the outlet end of VID 204 enables the blades 207 to pivot towards the central axis of rotation 205 at the outlet end of VID 204, thereby moving the VID 204 into the closed position. During conditions where the pressure on the outer faces of blades 207 is equal to or less than the pressure on the inner faces of blades 207, VID 204 is adjusted to (or maintained in) the open position.

FIGS. 3A-3D show details of a variable inlet device (VID) 300 which may be used as one of the variable inlet devices 204, 404, and 540 shown in FIGS. 2A-2B, 4A-4B, and 5A-5B. Specifically, FIG. 3A shows a side view of the VID 300 in an open position, FIG. 3B shows a side view of the VID 300 in a closed position, FIG. 3C shows a front view of the VID 300 in the open position, and FIG. 3D shows a front view of the VID 300 in the closed position.

As shown in FIGS. 3A-3D, the VID 300 includes a plurality of adjacently arranged blades 306 forming a ring around a central axis 301 of the VID 300 which may be collinear with a central axis of a compressor, as shown in FIGS. 2A-2B, 4A-4B, and 5A-5B. VID 300 has an inlet end formed by inlet ends (e.g., inlet blade edges) 304 of blades 306, the inlet end forming a first ring having a first diameter 303. VID 300 also has an outlet end formed by outlet ends (e.g., outlet blade edges) 302 of blades 306, the outlet end forming a second ring having a second diameter 305. The inlet ends 304 are arranged upstream of the outlet ends 302 when the VID 300 is positioned in a flow passage, such as the inlet conduits (e.g., intake passages) shown in FIGS. 2A-2B, 4A-4B, and 5A-5C. Each blade 306 has an outer surface 307 and an inner surface 309, where the inner surfaces 309 of all the blades 306 forms a flow passage 311 through the VID 300. In this way, gas (e.g., intake air) flowing through a passage in which the VID 300 is positioned (such as the inlet conduits or intake passages shown in FIGS. 2A-2B, 4A-4B, and 5A-5B) contacts the inner surfaces 309 and passes through the VID 300 via the flow passage 311. The direction of gas flow through VID 300 is shown by arrow 313. In FIGS. 3C-3D, the direction of gas flow through VID 300 is into the page. The open and closed positions of the VID 300 are achieved by pivoting the blades 306 toward and away from the central axis 301 at a pivot axis 329 arranged tangential to the inlet ring and perpendicular to the central axis 301, as explained further below.

FIG. 3A shows a side view of the VID 300 in the open position where the second diameter 305 may be equal to (as shown in FIG. 3A) or larger than the first diameter 303. As a result, flow through the VID 300 is not restricted from the inlet end to the outlet end. A frontal view of the VID 300, from the inlet ends 304 of the blades 306, in the open position, is shown in FIG. 3C. As shown in FIG. 3C, the first diameter 303 and the second diameter 305 are equal. Thus, in the open position, the blades 306 are relatively straight, from the inlet ends 304 to outlet ends 302, and arranged approximately parallel to the central axis. Each blade 306 has a pivot axis 329 about which the inlet end of each blade pivots between the open and closed position. As shown in FIG. 3C, the inlet end of each blade 306 includes a hinge element 331 arranged at the pivot axis 329. As such, the hinge elements 331 may allow each blade 306 to pivot between the open and closed positions. In one example, hinge elements 331 maybe torsional springs, positioned approximately tangential to the inlet ring of VID 300 and centered within the thickness 333 of the blades 306. The cross-sectional area of the blades 306, as seen in FIG. 3C, is smaller compared to that of the closed position (as discussed further below and shown in FIGS. 3B and 3D) and compared to that of devices that have blades or vanes that are oriented from a central axis of the device to an outer perimeter of the device. As a result of the positioning of the blades 306 in the open position, flow restriction through the VID 300 and to the impeller in the open position may be reduced (e.g., minimized).

As also seen in FIGS. 3A and 3C, each blade 306 includes side surfaces extending between the inlet end 304 and outlet end 302. For example, a first blade 315 has a first side surface 317 that contacts a side surface 319 of an adjacent, second blade 321. The first blade 315 has a second side surface 323 that contacts a side surface 325 of an adjacent, third blade 327. In the open position, the side surfaces (e.g., inner surfaces) of the blades 306 are contacting one another but they may not be overlapping. A side (e.g., profile) view of the VID 300 in the closed position is shown in FIG. 3B. FIG. 3D shows a frontal view (from the inlet end) of the VID 300 in the closed position. To move from the open position to the closed position, the outlet ends 302 of blades 306 are pivoted towards the central axis 301 via the pivot axes 329 arranged at the inlet ends of the blades 306. As a result, the second diameter 305 decreases and the first diameter remains the same as when the VID 300 is in the open position. In the closed position, as shown in FIGS. 3B and 3D, the second diameter 305 is smaller than the first diameter 303. Specifically, the second diameter 305 is smaller than the first diameter 303 by a first amount (e.g., difference between the first diameter 303 and the second diameter 305 is the first amount in the closed position). In the closed position, the blades 306 are angled inward toward the central axis 301, from the inlet ends 304 to the outlet ends 302. In the closed configuration, the inner surfaces 309 of the blades 306 restrict the flow from the inlet end 304 to the outlet end 302 due to the gradual decreasing diameter of the flow passage 311 of the VID 300, from the inlet end 304 to outlet end 302 (e.g., as flow passing through the flow passage 311 travels downstream). The inner surfaces 309 have a relatively smooth surface for guiding flow from the inlet end 304 to the outlet end 302. As seen in FIG. 3B, the outlet ends 302 of the blades 306 overlap one another (e.g., each blade overlaps an adjacent blade and is overlapping by another adjacent blade). However, inlet ends 304 of the blades 306 may not be overlapping in the closed position or may overlap less than the outlet ends 302. The overlapping arrangement of the blades at outlet ends 302 in the closed position provides a smooth inner surface with spiral grooves 308, as depicted in FIG. 3D, causing the gas flow to swirl upon passing through the VID 300. Specifically, as seen in FIG. 3D, each blade 306 is separated from adjacent blades 306 via a spiral groove 308. The spiral grooves 308 curve relative to central axis 301. In one example, the curvature of the spiral grooves 308 are biased to channel flow in a rotational direction that is the same as the rotation of the impeller of the compressor. For example, the blades 306 in FIGS. 3B and 3D overlap to create spiral grooves that swirl gas counterclockwise relative to the central axis 301 which may be collinear with a central rotational axis of the compressor impeller when installed upstream of the impeller in a compressor inlet conduit (as shown in FIGS. 2A-2B, 4A-4B, and 5A-5B). The swirled gas may then flow from the outlet end of the VID 300 to the impeller that also rotates counterclockwise.

FIGS. 4A-4B show a cut-away view of a third embodiment of a compressor 402 of a turbocharger including a casing treatment 416 and a VID 404 (such as VID 300 shown in FIGS. 3A-3D) positioned in an inlet conduit (also described herein as the compressor inlet) 406 of the compressor 402. In one embodiment, compressor 402 may be compressor 174 of FIG. 1. Compressor 402 includes the inlet conduit 406, impeller 408, diffuser 410, volute 412, casing 414 and casing treatment 416. Elements of compressor 402 may be described in the direction of gas flow and any element in the path of gas flow relative to a reference point is considered downstream of the reference point. Conversely any element positioned in the reverse direction of gas flow relative to a reference point is upstream of the reference point. The direction of gas flow is parallel with the central axis of rotation 403 of the impeller 408 and shown by arrow 405. The central axis of rotation of the impeller 408 will herein be referred to as the central axis of the compressor. The central axis of rotation of the compressor 402 may also be a central axis of inlet conduit 406 and central axis of VID 404, as described above and further below.

Compressor 402 may be rotationally coupled to a shaft connected to a turbine (such as 180 and 176 in FIG. 1) that is arranged parallel to the central axis of rotation and transfers energy to the impeller 408. Impeller 408 may also be referred to herein as a compressor wheel. The rotation of impeller 408 draws gas into compressor 402 through intake conduit 406 of casing 414. Gas flows through the VID 404 and to the impeller 408 and then gas flow is accelerated by impeller 408 through diffuser 410 into volute 412. Deceleration occurs during flow through diffuser 410 into volute 412, causing an increase in pressure. Gas under pressure may flow from volute 412 to the intake manifold.

Impeller 408 includes a plurality of blades 418, a hub 420, and has the central axis of rotation 403 which is arranged parallel to the direction of flow through the inlet conduit 406. The casing treatment 416 includes a recirculation passage (also referred to as a resonance chamber) 424, a bleed port 422, an actuation port 423, and a recirculation port 430. The actuation port 423 is formed in the inner wall 425 of inlet conduit 406 and fluidly couples the recirculation passage to the inlet conduit 406 at a position directly adjacent to a plurality of blades 407 of VID 404. More specifically, the actuation port 423 is positioned between an inlet (e.g., upstream) end and outlet (e.g., downstream) end of the VID 404. Further, the actuation port 423 is positioned between the bleed port 422 and recirculation port 430 in the recirculation passage 424.

The recirculation passage 424 is formed by the casing (e.g., outer casing) 414 of the compressor 402 and surrounds the inlet conduit 406. Thus, the recirculation passage 424 may be an annular passage surrounding and arranged in parallel with the inlet conduit 406. The recirculation passage 424 is separated from the inlet conduit 406 by an inner wall 425 of the casing 414 which is the wall forming inlet conduit 406. Additionally, the recirculation passage 424 is fluidly coupled with the inlet conduit 406 via the bleed port 422 and recirculation port 430. The bleed port 422 is formed in the inner wall 425 downstream of a leading edge of impeller 408 and upstream of the diffuser 410. In one example, the bleed port 422 is a slot located in and through the inner wall 425. An inlet to the bleed port 422 may be arranged directly adjacent to the impeller blades 418. The bleed port 422 is an entry to the recirculation passage 424. The recirculation passage 424 adjoins to the recirculation port 430 which is formed in the wall 425 upstream of an inlet end of the VID 404. Recirculation port 430 is configured to enable gas to flow between inlet conduit 406 and recirculation passage 424. The bleed port 422, actuation port 423, recirculation passage 424, and recirculation port 430 alleviate pressure accumulation downstream of the impeller 408. This may reduce surge conditions by circulating air back to the compressor inlet 406 and extends the surge margin of the compressor 402.

As shown in FIGS. 4A-4B, the VID 404 is arranged in the inlet conduit 406, upstream of the leading edge of the impeller 408 and downstream of where the recirculation port 430 couples to the inlet conduit 406. VID 404 includes the plurality of blades 407 arranged adjacent to one another in a ring configuration around central axis 403. The configuration of VID 404 is described in detail above with reference to FIGS. 3A-3D. As shown in FIGS. 4A-4B, the VID 404 spans across an entirety of the inlet conduit 406. Specifically, ends of the blades 407 of VID 404 are positioned proximate to inner wall 425 of casing 414. Additionally, an entirety of VID 404 is positioned upstream of an entirety of impeller 408, including a leading edge of impeller blades 418.

FIG. 4A shows a first schematic 400 of compressor 402 with VID 404 in a closed position (such as the closed position of VID 300 shown in FIGS. 3B and 3D) with outlet blade ends 426 of blades 407, which are arranged furthest downstream in the inlet conduit 406 relative to inlet blade ends 428 of blades 407, pivoted inward toward the central axis 403 and the inlet blade ends 428 arranged proximate to the inner walls 425 of inlet conduit 406. In one example, actuation port 423 may allow recirculated gases through the recirculation passage 424 to act upon VID 404 in a similar manner as described above with reference to FIG. 2C. During conditions where the pressure at the impeller blades 418 and in the recirculation passage 424 is higher than in inlet conduit 406, upstream of VID 404, recirculation flow is increased in an opposite direction from gas flow 405, through the recirculation passage 424, as indicated by arrow 431. Gas flow also follows the path indicated by arrow 429, thereby applying greater pressure on the outer faces (e.g. the surfaces facing inner wall 425) of blades 407 of VID 404 than the pressure experienced by the inner faces of blades 407 due to gas flow 405. As such, the outlet blade ends 426 of VID 404 are pivoted inwards towards the central axis of rotation 403 and VID 404 is actuated into a closed position.

As shown in FIG. 4A, the inlet blade ends 428 may be touching or contacting the inner walls 425 when the VID 404 is in the closed position. As explained above with reference to FIGS. 3B and 3D, the outlet blade ends 426 form a ring with a smaller diameter than the inlet blade ends 428. The overlapping arrangement of the outlet blade ends 426 creates a smooth inner surface that restricts the flow through the compressor inlet 406, thereby improving the compressor efficiency under light engine loads. The inner grooves formed by the overlapping blade edges 426 generates pre-swirl in the flow upstream of the impeller 408, rotating the flow in the same direction as the rotation of the impeller blades 418.

FIG. 4B shows a second schematic 401 with VID 404 in an open position (such as the open position of VID 300 shown in FIGS. 3A and 3C). In one example, the pressure at impeller blades 418 and upstream in the recirculation passage 424 is equal to or less than the pressure in inlet conduit 406, upstream of VID 404, and the pressure of gas flow through recirculation passage as indicated by arrow 431 may be equal to or less than gas flow 405. As a result, the blades 407 of VID 404 experience equal or less pressure on the outer faces than the inner faces and VID 404 is actuated into the open position.

In the open position, the outlet blade ends 426 are pivoted outward towards the inner wall 425 and away from the central axis 403. In one example, both the inlet blade ends 428 and the outlet blade ends 426 may contact the inner wall 425 in the open position. When the VID 404 is in the open position, the diameter of the ring formed by the outlet blade ends 426 is equal to the diameter of the ring formed by the inlet blade ends 428. This minimizes restriction on the flow of gas through the VID 404 and to the impeller 408 and may be the commanded configuration of the VID 404 under medium to high engine loads, as described further below.

FIGS. 5A-5B show a cut-away view of a fourth embodiment of a compressor 502 of a turbocharger including an active casing treatment (ACT) and a VID 540 (such as VID 300 shown in FIGS. 3A-3D) positioned in an inlet conduit (e.g., intake passage) of the compressor 502. In one embodiment, compressor 502 may be compressor 174 of FIG. 1. A turbine, such as turbine 176 shown in FIG. 1, may be rotationally coupled to compressor 502 via a shaft 504. Specifically, the turbine converts the energy of the exhaust gas into rotational energy for rotating drive shaft 504 connected to impeller 506. Impeller 506 may also be referred to herein as a compressor wheel. Compressor 502 includes impeller 506, diffuser 508, volute (e.g., compressor chamber) 510, active casing treatment 512, and casing 514. The rotation of impeller 506, draws gas into compressor 502 through compressor inlet 516 of casing 514. As non-limiting examples, the gas may include air from an intake passage, exhaust gas (such as when using long loop EGR), gaseous fuel (such as when using port injection of fuel), and combinations thereof. Gas flows from compressor inlet 516 and is accelerated by impeller 506 through diffuser 508 into volute 510. Diffuser 508 and volute 510 decelerate the gas causing an increase in pressure in volute 510. Gas under pressure may flow from volute 510 to the intake manifold.

Elements in compressor 502 may be described relative to the direction of the gas flow path through compressor 502. An element substantially in the direction of gas flow relative to a reference point is downstream from the reference point. An element substantially opposite the direction of gas flow relative to a reference point is upstream from the reference point. For example, compressor inlet 516 is upstream from impeller 506 which is upstream from diffuser 508. Diffuser 508 is downstream from impeller 506 which is downstream from compressor inlet 516.

Impeller 506 includes hub 518 and a plurality of blades, including full blade 520 and splitter 522. Full blade 520 and splitter 522 are attached to hub 518. The edge of full blade 520 that is most upstream in compressor 502 is the leading edge of full blade 520. Similarly, splitter 522 includes a leading edge at the most upstream portion of splitter 522. The leading edge of full blade 520 is upstream of splitter 522. Impeller 506 includes an axis of rotation 524 aligned with the axis of rotation for drive shaft 504 and a turbine hub of the turbine. The axis of rotation 524 is substantially parallel with the flow of gas at the compressor inlet 516 and substantially perpendicular to the flow of gas at the diffuser 508. The axis of rotation 524 may also be referred to herein as a central axis of the compressor 502.

Casing 514 includes compressor inlet 516, intake passage (also referred to herein as an inlet conduit) 526, recirculation passage 528, recirculation port 530, actuation port 525, bleed port 532, and injection port 534. Impeller 506 is contained in intake passage 526. Bleed port 532 is downstream of the leading edge of full blade 520 and upstream of the leading edge of splitter 522. Injection port 534 is downstream of the leading edge of splitter 522. Actuation port 525 is directly adjacent to VID 540, upstream of active casing 512, bleed port 532, and injection port 534, and downstream of recirculation port 530. Recirculation port 530 is downstream of compressor inlet 516 and upstream of impeller 506. Recirculation port 530 is configured to enable gas to flow between intake passage 526 and recirculation passage 528.

Actuation port 525 is adapted to passively actuate VID 540 between open and closed conditions depending on pressure differentials experienced between the outer surface (e.g., surface facing the intake passage wall 507) of an outlet end 503 of blades of VID 540 versus the inner surface of the outlet end 503 of blades of VID 540. During conditions wherein the pressure is higher at outlet downstream end of compressor 502 (proximate to impeller 506, bleed port 532, and/or injection port 534) than upstream in inlet conduit 516 (e.g., upstream of VID 540), gas flow recirculation is increased through recirculation passage 528 in a direction opposite to the flow through the intake passage 526. Gas may flow from the recirculation passage 528 and through actuation port 525 via the route depicted by arrow 542 and generate higher pressure on the outer surfaces of the outlet end 503 of VID 540 than the pressure experienced by the inner surfaces of the outlet end 503 due to gas flow through 526. As a result, the position of the outlet end 503 of VID 540 may be adjusted to the closed position, as shown in FIG. 5A. When the pressure experienced by the outer surfaces of the outlet end 503 of VID 540 is less than or equal to that exerted on the inner surfaces, VID 540 is actuated into the open position, as shown in FIG. 5B, thereby minimizing restriction on gas flow through intake passage 526.

Active casing treatment 512 is configured to control gas flow through compressor 502. Specifically, active casing treatment 512, controlled by a controller (e.g., controller 12 shown in FIG. 1), may selectively control the flow of gas through bleed port 532 and injection port 534. During low mass flow conditions, active casing treatment 512 may enable gas to flow from intake passage 526 through bleed port 532 into recirculation passage 528. The gas further continues from recirculation passage 528 through recirculation port 530 into intake passage 526. Thus, the flow of gas striking the leading edge of full blade 520 may be greater than without bleed port 532. The additional flow of gas may enable the turbocharger compressor to operate with less flow of gas through the compressor before surge occurs.

During high mass flow conditions, active casing treatment 512 may enable gas to flow through injection port 534. During high mass flow conditions, a low pressure zone may be present in intake passage 526 downstream of the leading edge of splitter 522 adjacent to injection port 534. The low pressure zone may induce gas to flow from intake passage 526 through recirculation port 530 into recirculation passage 528 through injection port 534 back into intake passage 526. The short-circuit path through recirculation passage 526 may enable the flow of gas through the compressor to be increased at high mass flow conditions when compared to a compressor without injection port 534. In this way, the short-circuit flow of gas may enable more gas to flow before the turbocharger is in the choke operating condition.

Intake passage 526 may be substantially cylindrical. Recirculation passage 528 may be substantially annular since it is external to intake passage 526. The ports connecting intake passage 526 and recirculation passage 528, such as recirculation port 530, injection port 534, and bleed port 532 may each be implemented with various means. For example, the ports may be constructed as one or more holes formed in a wall 525 of (e.g., a wall forming) the intake passage 526. In one example, the wall 525 may be part of the casing 514. As another example, the ports may be constructed as one or more slots extending around the circumference of the intake passage and through a wall of casing that forms the intake passage. The ports may have a uniform or non-uniform width along the length of the port from intake passage 526 to recirculation passage 528. Each port may have a centerline extending along the length of the port from intake passage 526 to recirculation passage 528. The centerline may be normal to the axis of rotation 524 of impeller 506, or the centerline may have a non-zero slope when compared to the normal to the axis of rotation of impeller 506.

Active casing treatment 512 may be implemented in many ways. For example, a slideable casing sleeve may be fitted in the recirculation passage to selectively block the flow of gas through injection port 534 and/or bleed port 532. The casing sleeve may include one or more holes and/or one or more slots 536, as shown in FIGS. 5A-5B, that align with injection port 534 and/or bleed port 532 depending on the position of the casing sleeve. For example, when a controller, such as controller 12, detects low mass flow conditions, the casing sleeve may be adjusted so that slots 536 in the casing sleeve align with bleed port 532 and slots 536 in the casing sleeve do not align with injection port 534. In this way, the casing sleeve may be adjusted so that bleed port 532 is open and injection port 534 is blocked during low mass flow conditions.

As another example, when a controller detects high mass flow conditions, the casing sleeve may be adjusted so that slots 536 in the casing sleeve align with injection port 534 but slots 536 in the casing sleeve do not align with and bleed port 532. In this way, the casing sleeve may be adjusted so that injection port 534 is open and bleed port 532 is blocked during high mass flow conditions. In an alternative embodiment, active casing treatment 512 may be adjusted based on a pressure differential across compressor inlet 516 and the intake manifold. In yet another alternative embodiment, active casing treatment 512 may be adjusted based on a pressure differential across the intake manifold and turbine inlet. In still another alternative embodiment, active casing treatment 512 may be adjusted based on engine load and engine speed conditions of the engine (e.g., a current operating speed and load of the engine) in relation to surge and choke thresholds. It will be understood that these specific embodiments are presented for example, and are not intended to be limiting in any manner.

As shown in FIGS. 5A-5B, a variable inlet device (VID) 540 is positioned within intake passage 526, upstream of the impeller 506. The VID 540 may be VID 300 shown in FIGS. 3A-3D, as described above. FIG. 5A shows a first schematic 500 with the VID adjusted (e.g., actuated) into a closed position, as described above with reference to FIGS. 3A and 3C, while FIG. 5B shows a second schematic 550 with the VID adjusted (e.g., actuated) into an open position, as described above with reference to FIGS. 3B and 3D.

Specifically, the outlet end 503 of the VID 540 is arranged upstream of the bleed port 532 and the inlet end 505 is arranged downstream of recirculation port 530. The VID 540 spans across an entirety of the intake passage 526 and is arranged adjacent to walls 507 of the intake passage 526. Under lighter load conditions, the VID 540 may be passively actuated into the closed position by flow through the actuation port, as shown in FIG. 5A, and the active casing 512 may be adjusted into a position that allows the bleed port 532 to be open. The spiral inner grooves created by the overlapping arrangement of the blades of the VID 540 at the outlet end creates pre-swirl flow in the air passing through the VID 540 before contacting the downstream impeller 506. The combination of recirculating air flow from the intake passage 526 downstream of the VID 540 through bleed port 532, into recirculation passage 528, and back into intake passage 526 via recirculation port 530 with the pre-swirl flow generated by the closed VID 540 may increase the compressor surge margin.

For medium engine loads, the VID 540 is actuated to the open position, by the actuation method described above, as shown in FIG. 5A and the active casing 512 is adjusted so that the bleed port 532 and injection port 534 are closed. Flow restriction is minimized through the VID 540 and circulation through bleed port 532 and injection port 534 is inhibited. For higher mass flow and higher engine load conditions, the VID 540 remains open and the active casing 512 is adjusted to allow the injection port 534 to be open to the intake passage 526. The flow of air through recirculation port 530 is enabled, continuing into the recirculation passage and entering the intake passage 526 through injection port 534. This short-circuit flow improves the choke margin at high engine loads.

In alternate embodiments of FIGS. 4A-4B and 5A-5B, the VID may be actively controller via an actuator in electronic communication with a controller (as shown in FIGS. 2A-2B). In these embodiments, the recirculation passage may not include the actuation passage described above.

FIGS. 2A-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 6, a flow chart of a method 600 for controlling operation (e.g., controlling a position) of a variable inlet device positioned in an inlet conduit of a compressor is shown. Specifically, the variable inlet device (VID) may be VID 300 shown in FIGS. 3A-3D. The VID may be positioned in an inlet conduit of a compressor, upstream of an impeller, such as the VID 204 shown in FIGS. 2A-2C. In some embodiments, the VID may be positioned in the inlet conduit of a compressor, upstream of the impeller, where the compressor additionally includes a casing treatment including a recirculation passage, such as the VID 404 shown in FIGS. 4A-4B. Instructions for carrying out method 600 and the rest of the methods included herein may be executed by a controller (e.g., controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may employ an actuator of the VID to adjust the VID between an open position (as shown in FIGS. 2A, 3A, 3C, and 4B) and a closed position (as shown in FIGS. 2B, 3B, 3D, and 4A). An example of such an actuator coupled to the VID is shown in FIGS. 2A-2B, as described above. In alternate embodiments, the VID may be passively actuation via a pressure differential between outer and inner surfaces of the outlet ends of the blades of the VID, as shown in FIGS. 2C and 4A-4B. In these embodiments, method 600 may not be executed by a controller but passively via the various channels and actuation passages described above according to changing pressure differentials that occur at certain thresholds, such as a surge threshold. Thus, in the method described below, the opening and closing of the VID may occur passively based on the changing pressure differentials above and below the surge threshold.

At 602, the method includes estimating and/or measuring engine operating conditions. Engine operating conditions may include engine speed, engine load, engine temperatures (such as engine coolant temperature), mass air flow to the engine, intake manifold pressure, a pressure differential across a compressor, a mass air flow rate through the compressor, a position of the VID, etc. At 604, the method includes determining whether current engine operation is below a surge threshold. Current engine operation below a surge threshold may include a current (e.g., currently determined) engine load and engine speed being below a surge line or threshold. For example, a map of engine load vs. engine speed, such as map 700 shown in FIG. 7, may be stored in a memory of the controller. Looking at FIG. 7, map 700 includes an operational boundary line 702. All the possible engine speed and engine load operational points of the engine may be contained within the axes and operational boundary line 702. The map 700 also includes a surge threshold line 704. When the engine is operating at an engine speed and engine load point that falls below, or to the left, of the surge threshold line 704, the likelihood of compressor surge may be increased relative to when the engine is operating at an engine speed and engine load point that falls above, or to the right, of the surge threshold line 704. Map 700 includes two areas: a first area 706 which is below, or to the left of, the surge threshold line 704 and a second area 708 which is above, or to the right of, the surge threshold line 704. As explained further below, when the engine is operating at an engine speed and engine load point that falls within the first area 706, the engine may be operating under a lighter load condition and the controller may actuate the VID to be in the closed position. Conversely, when the engine is operating at an engine speed and engine load point that falls within the second area 708, the engine may be operating under a higher load condition and the controller may actuate the VID to be in the open position. In alternate embodiments, instead of a map of engine speed and engine load, the controller may utilize a map of compressor conditions, such as differential pressure across the compressor and mass air flow through the compressor relative to a surge line to determine which position to adjust the VID into.

Returning to FIG. 6, at 604, the controller may determine whether the engine is operating below the surge threshold using a stored map or look-up table similar to that of map 700 shown in FIG. 7. For example, the controller may determine the current engine speed and engine load and then look up whether this operating point in above or below the surge threshold. In one example, the surge threshold may be a pre-set surge threshold stored in the map or look-up table. If the engine is not operating below the surge threshold (e.g., the current engine speed and load point is in the second area 708 shown in map 700), the method continues to 606 to open the VID. Opening the VID may include the controller sending an electronic signal to an actuator of the VID (such as actuator 209 shown in FIGS. 2A-2B) to either adjust the VID from the closed position to the open position or to maintain the VID in the open position. The open position of the VID is shown in FIGS. 2A, 3A, 3C, and 4B, as described above. As explained above with reference to these figures, in the open position, an inner surface of the VID does not restrict flow through the VID, from an inlet end to outlet end of the VID. Adjusting the VID from the closed position to the open position may include pivoting a plurality of adjacently arranged blades of the VID, via the actuator coupled to pivot axes of the blades, in a direction relative to a central axis of the compressor (about which the impeller rotates) to decrease overlapping of the plurality of adjacently arranged blades at the outlet end of the VID and increase a diameter of the outlet end of the VID.

In an alternative embodiment, when the VID is passively actuated (instead of actively via the controller) via pressure differentials across the VID via a channel or actuation port in a wall of the inlet conduit, the method may include flowing gas through a recirculation chamber or passage (as shown in FIGS. 4A-4B) in the opposite direction of flow through the intake passage, thereby returning gas to the intake passage. This may occur during conditions where the engine is operating below the surge threshold, e.g. at 608 in FIG. 6, and results in higher pressure at the outlet end of the compressor (as defined as downstream of the leading edge of the compressor impeller) versus the inlet end of the compressor (as defined as upstream of the impeller and the VID). The pressure differential across the compressor results in reverse flow through the recirculation chamber or passage which generates gas flow through a channel or actuation port directly adjacent to the VID, an arranged in the recirculation passage, downstream from the impeller and upstream from the recirculation port, as shown in FIGS. 4A-4B. The gas flow through the channel or actuation port applies a pressure on the outer surfaces, (e.g. facing the walls of the intake passage) of the blades of the VID that is greater than the pressure experienced by the inner surfaces of the blades that results from gas flow through the intake passage. The pressure differential across the blades of the VID actuates the VID into the closed position, directing 604 to proceed to 608 in FIG. 6.

During conditions wherein the engine is operating above the surge threshold and the pressure at the outlet end is less than or equal to the pressure at the inlet end of the compressor, the method may include gas flow through the intake passage that is equal to or greater than gas flow through the recirculation chamber and the channel or actuation port, resulting in the pressure experienced at the inner surfaces of the blades of the VID being greater than or equal to the pressure applied to the outer surfaces of the blades, thereby actuating or maintaining the VID in the open position. As such, 604 continues to 606 in FIG. 6.

Alternatively at 604, if the engine is operating below the surge threshold (e.g., the current engine speed and load point is in the first area 706 shown in map 700), the method continues to 608 to close the VID. Closing the VID may include the controller sending an electronic signal to the actuator of the VID to either adjust the VID from the open position to the closed position or to maintain the VID in the closed position. The closed position of the VID is shown in FIGS. 2B, 3B, 3D, and 4A, as described above. As explained above with reference to these figures, in the closed position, the inner surface of the VID narrows along a length of the VID and generates swirl flow at the outlet end of the VID. Adjusting the VID from the open position to the closed position may include pivoting each blade of the VID, via the actuator coupled to pivot axes of the blades, so that the outlet end of each blade pivots toward the central axis of the compressor and the inlet end of each blade pivots away from the central axis of the compressor.

Turning to FIG. 8, a flow chart of a method 800 for coordinating control of a position of a variable inlet device positioned in an inlet conduit of a compressor and control of an active casing treatment of the compressor is shown. Specifically, the variable inlet device (VID) may be VID 300 shown in FIGS. 3A-3D. The VID may be positioned in an inlet conduit of a compressor having an active casing treatment, upstream of an impeller, such as the VID 540 shown in FIGS. 5A-5B. Instructions for carrying out method 800 may be executed by a controller (e.g., controller 12 shown in FIG. 1 or controller 211 shown in FIGS. 2A-2B) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may employ an actuator of the VID to adjust the VID between an open position (as shown in FIGS. 3A, 3C, and 5B) and a closed position (as shown in FIGS. 3B, 3D, and 5A). An example of such an actuator coupled to the VID is shown in FIGS. 2A-2B, as described above. In alternate embodiments, the VID may be passively actuation via a pressure differential between outer and inner surfaces of the outlet ends of the blades of the VID, as shown in FIGS. 5A-5B. In these embodiments, method 800 may not be executed by a controller but passively via the various channels and actuation passages described above according to changing pressure differentials that occur at certain thresholds, such as a surge threshold. Thus, in the method described below, the opening and closing of the VID may occur passively based on the changing pressure differentials above and below the surge threshold.

At 802, the method includes estimating and/or measuring engine operating conditions. Engine operating conditions may include engine speed, engine load, engine temperatures (such as engine coolant temperature), mass air flow to the engine, intake manifold pressure, a pressure differential across a compressor, a mass air flow rate through the compressor, a position of the VID, the position of the active casing treatment (e.g., the position of a sliding sleeve along an inner wall of the casing relative to bleed, surge, and recirculation slots of the inner wall), etc. At 804, the method includes determining whether current engine operation is below a surge threshold. Current engine operation below a surge threshold may include a current (e.g., currently determined) engine load and engine speed being below a surge line or threshold. For example, a map of engine load vs. engine speed, such as map 900 shown in FIG. 9, may be stored in a memory of the controller. Looking at FIG. 9, map 900 includes an operational boundary line 902. All the possible engine speed and engine load operational points of the engine may be contained within the axes and operational boundary line 902. The map 900 also includes a surge threshold line 904 and a choke threshold line 906. When the engine is operating at an engine speed and engine load point that falls below, or to the left, of the surge threshold line 904, the likelihood of compressor surge may be increased relative to when the engine is operating at an engine speed and engine load point that falls above, or to the right, of the surge threshold line 904. Further, when the engine is operating at an engine speed and engine load point that falls above, or the right, of the choke threshold line 906, the likelihood of compressor choke may be increased relative to when the engine is operating at an engine speed and engine load point that falls below, or to the left, of the choke threshold line 906.

Map 900 includes three areas: a first area 908 which is below, or to the left of, the surge threshold line 904, a second area 910 which is above, or to the right of, the surge threshold line 904 and below, or to the left of, the choke threshold line 906, and a third area 912 which is above, or to the right of, the choke threshold line 906. As explained further below, when the engine is operating at an engine speed and engine load point that falls within the first area 908, the engine may be operating under a lighter load condition and the controller may actuate the VID to be in the closed position while also actuating the active casing treatment (ACT) into a position for surge control. In one example, actuating the ACT into the position for surge control may include adjusting a sliding sleeve of the ACT into a first position where a plurality of sleeve slots of the sliding sleeve are aligned with a bleed port (such as bleed port 532 shown in FIGS. 5A-5B). In the first position, gas may flow between the intake passage of the compressor and recirculation passage of the ACT via the bleed port and recirculation port of the ACT. When the engine is operating at an engine speed and engine load point that falls within the second area 910, the engine may be operating under a medium load condition and the controller may actuate the VID to be in the open position and the ACT to be closed to both the surge port and an injection port (such as injection port 534 shown in FIGS. 5A-5B). In one example, actuating the ACT to be closed to both the surge and injection ports may include adjusting the sliding sleeve of the ACT into a second position where the plurality of sleeve slots are not aligned with either the bleed port or the injection port. As a result, gas does not flow between the intake passage and recirculation passage via either of the bleed port and injection port. Finally, when the engine is operating at an engine speed and engine load point that falls within the third area 912, the engine may be operating under a higher load condition and the controller may actuate the VID to be in the open position and the ACT into a position for choke control. In one example, actuating the ACT into the position for choke control may include adjusting the sliding sleeve of the ACT into a third position where the plurality of sleeve slots are aligned with the injection port. In the third position, gas flows between the intake passage and recirculation passage via the injection port and recirculation port. In alternate embodiments, instead of a map of engine speed and engine load, the controller may utilize a map of compressor conditions, such as differential pressure across the compressor and mass air flow through the compressor relative to a surge line and choke line to determine which position to adjust the VID and ACT into.

Returning to FIG. 8, at 804, the controller may determine whether the engine is operating below the surge threshold using a stored map or look-up table similar to that of map 900 shown in FIG. 9. For example, the controller may determine the current engine speed and engine load and then look up whether this operating point is above or below the surge threshold and/or above or below the choke threshold. In one example, the surge threshold may be a pre-set surge threshold and the choke threshold may be a pre-set choke threshold stored in the map or look-up table. If the engine is operating below the surge threshold (e.g., the current engine speed and load point is in the first area 908), the method continues to 806 to close the VID and adjust the ACT to be open to the surge slot. Closing the VID may include the controller sending an electronic signal to the actuator of the VID to either adjust the VID from the open position to the closed position or to maintain the VID in the closed position. The closed position of the VID is shown in FIGS. 3B, 3D, and 5A, as described above. As explained above with reference to these figures, in the closed position, the inner surface of the VID narrows along a length of the VID and generates swirl flow at the outlet end of the VID. Adjusting the VID from the open position to the closed position may include pivoting each blade of the VID, via the actuator coupled to pivot axes of the blades, so that the outlet end of each blade pivots toward the central axis of the compressor and the inlet end of each blade pivots away from the central axis of the compressor. Adjusting the ACT to be open to the surge slot may include adjusting the slideable sleeve of the ACT into a first position where the plurality of sleeve slots of the ACT are aligned with the bleed port (such as the ACT 512 and bleed port 532 shown in FIGS. 5A-5B). In one example, the method at 806 may include closing the VID at the same time as adjusting the ACT to be open to the surge slot. In this way, the controller may send two actuation signals, one to close the VID and one to open the ACT to the surge slot, in response to the engine operating below the surge threshold.

Alternatively at 804, if the engine is not operating below the surge threshold (e.g., the current engine speed and load point is in the second area 910 or third area 912 shown in map 900), the method continues to 808 to determine whether the engine is operating above the choke threshold. For example, the controller may determine the current engine speed and engine load and then look up (using map 900 or a similar map or look up table stored in the memory of the controller) whether this operating point is above or below the choke threshold. If the engine is operating above the choke threshold (e.g., the current engine speed and load point is in the third area 912), the method continues to 810 to open the VID and adjust the ACT to be open to the choke slot. Opening the VID may include the controller sending an electronic signal to an actuator of the VID (such as actuator 209 shown in FIGS. 2A-2B) to either adjust the VID from the closed position to the open position or to maintain the VID in the open position. The open position of the VID is shown in FIGS. 3A, 3C, and 5B, as described above. As explained above with reference to these figures, in the open position, an inner surface of the VID does not restrict flow through the VID, from an inlet end to outlet end of the VID. Adjusting the VID from the closed position to the open position may include pivoting a plurality of adjacently arranged blades of the VID, via the actuator coupled to pivot axes of the blades, in a direction relative to a central axis of the compressor (about which the impeller rotates) to decrease overlapping of the plurality of adjacently arranged blades at the outlet end of the VID and increase a diameter of the outlet end of the VID. Adjusting the ACT to be open to the choke slot may include adjusting the slideable sleeve of the ACT into a third position where the plurality of sleeve slots of the ACT are aligned with the injection port (such as the ACT 512 and injection port 534 shown in FIGS. 5A-5B). In one example, the method at 810 may include opening the VID at the same time as adjusting the ACT to be open to the choke slot. In this way, the controller may send two actuation signals, one to open the VID and one to open the ACT to the choke slot, in response to the engine operating above the choke threshold.

Alternatively at 808, if the engine is not operating above the choke threshold, the engine may be operating at an engine speed and load point in the second area 910 shown in map 900. In response to operation below the choke threshold but above the surge threshold, the method continues to 812 to open the VID and adjust the ACT to be closed to both the surge slot (e.g., bleed port 532 shown in FIGS. 5A-5B) and the choke slot (e.g., injection port 534 shown in FIGS. 5A-5B). Adjusting the ACT to be closed to both the surge slot and choke slot may include adjusting the slideable sleeve of the ACT into a second positon where the plurality of sleeve slots are not aligned with either the bleed port or the injection port. In one example, the method at 812 may include opening the VID at the same time as adjusting the ACT to be closed to both the surge and choke slots. In this way, the controller may send two actuation signals, one to open the VID and one to close the ACT to the choke and surge slots, in response to the engine operating below the choke threshold and above the surge threshold.

In an alternative embodiment, when the VID is passively actuated (instead of actively via the controller) via pressure differentials across the VID via a channel or actuation port in a wall of the inlet conduit, the method may include flowing gas through a recirculation chamber (as shown in FIGS. 4A and 5A) in the opposite direction of flow through the intake passage, thereby returning gas to the intake passage. This may occur during conditions where the engine is operating below the surge threshold, e.g. at 806 in FIG. 8, and results in higher pressure at the outlet end of the compressor versus the inlet end. The pressure differential across the compressor results in reverse flow through the recirculation chamber which generates gas flow through a channel or actuation port directly adjacent to the VID and downstream from the bleed port, surge slot and impeller and upstream of the recirculation port, as shown in FIGS. 5A-5B. The gas flow through the channel or actuation port applies a pressure on the outer surfaces, (e.g. facing the walls of the inlet passage) of the blades of the VID that is greater than the pressure experienced by the inner surfaces of the blades as resulting from gas flow through the intake passage. The pressure differential across the blades of the VID actuates the VID into the closed position, resulting in 804 continuing to 806 in FIG. 8.

During conditions wherein the engine is operating above the surge threshold and the pressure at the outlet end is less than or equal to the pressure at the inlet end of the compressor, the method may include gas flow through the intake passage that is equal to or greater than gas flow through the recirculation chamber and the channel or actuation port, resulting in the pressure experienced at the inner surfaces of the blades of the VID being greater than or equal to the pressure applied to the outer surfaces of the blades, thereby actuating or maintaining the VID in the open position. As such, 804 proceeds to 808 in FIG. 8.

In this way, a variable inlet device (VID) positioned within an inlet conduit of a compressor, upstream of an impeller of the compressor, may be used to adjust the flow through the inlet conduit and to the impeller. The VID may include a plurality of adjacently arranged blades arranged in a ring centered along a central, rotational axis of the compressor. Each blade includes an inlet end arranged upstream from an outlet end, where each blade is adapted to pivot about an axis arranged tangent to the ring and perpendicular to the central, rotational axis of the compressor. In one example, the VID may be adjusted into an open position where the outlet ends of the blades are pivoted away from the central, rotational axis and positioned proximate to a wall of the inlet conduit. In this positon, flow restriction through the VID and to the impeller may be reduced, thereby increasing compressor performance in this position. In another example, the VID may be adjusted into a closed position where the outlet ends of the blades are pivoted toward the central, rotational axis and adjacently arranged blades overlap one another. This creates a narrowing path through the VID, from the inlet to outlet end, and internal spiral grooves that create pre-swirl flow to the impeller. The technical effect of adjusting the VID into the closed position under lighter load conditions is increasing compressor efficiency while also reducing the likelihood of surge. The technical effect of adjusting the VID into the open position under higher load conditions is reducing flow restriction to the impeller, thereby increasing compressor efficiency and reducing the likelihood of choke under some conditions. Additionally, by combining the VID with an active casing treatment on the compressor, compressor surge control and choke control may be increased while also improving compressor efficiency at lighter and higher load conditions, as explained above.

As one embodiment a compressor includes: an impeller rotatable about a central axis; and an inlet conduit including a variable inlet device (VID) positioned therein, upstream of the impeller, and including a plurality of adjacently arranged blades forming a ring around the central axis with inner surfaces of the blades forming a flow passage through the VID, each of the blades being pivotable, about an axis arranged tangent to the ring, between an open and closed position. In a first example of the compressor, each blade of the plurality of blades includes an inlet end and an outlet end, the inlet end arranged upstream of the outlet end, and wherein the flow passage is formed within the inner surfaces of the blades, between the inlet end and outlet end of each blade. A second example of the compressor optionally includes the first example, and further includes wherein each blade includes side surfaces extending between the inlet end and outlet end and wherein, for each blade, a first side surface of the side surfaces contacts a side surface of a first adjacent blade and a second side surface of the side surfaces contacts a side surface of a second adjacent blade. A third example of the compressor optionally includes one or more of the first and second examples, and further includes wherein an inlet end of the VID is formed by the inlet end of each blade and an outlet end of the VID is formed by the outlet end of each blade and wherein in the closed position the inlet end of the VID has a larger diameter than the outlet end of the VID. A fourth example of the compressor optionally includes one or more of the first through third examples, and further includes wherein outlet ends of adjacent blades of the plurality of blades overlap more than inlet ends of adjacent blades of the plurality of blades in the closed position. A fifth example of the compressor optionally includes one or more of the first through fourth examples, and further includes wherein in the open position, each of the inlet end of the VID and the outlet end of the VID have a larger diameter than the outlet end of the VID in the closed position and wherein a difference in diameter between the inlet end and the outlet end of the VID in the open position is decreased relative to the closed position. A sixth example of the compressor optionally includes one or more of the first through fifth examples, and further includes wherein in the closed position the outlet end of each blade is positioned closer to the central axis than the inlet end of each blade and the inlet end of each blade is positioned proximate to the inner wall of the inlet conduit. A seventh example of the compressor optionally includes one or more of the first through sixth examples, and further includes wherein in the open position, the inner surfaces of the blades are contacting one another but not overlapping and are arranged parallel to the central axis. An eighth example of the compressor optionally includes one or more of the first through seventh examples, and further includes wherein in the closed position, the inner surfaces of the blades are angled relative to flow through the inlet conduit and form a smooth surface with a plurality of spiral grooves facing the flow, where the blades are angled inward toward the central axis from an inlet end to an outlet end of the VID, the outlet end arranged downstream in the inlet conduit from the inlet end and wherein the plurality of spiral grooves are formed by overlapping inner surfaces of the plurality of adjacently arranged blades. A ninth example of the compressor optionally includes one or more of the first through eighth examples, and further comprising a channel arranged in the inlet conduit, upstream of the impeller and downstream of an inlet end of the VID, where the channel extends outward from the central axis so inner walls of the inlet conduit in the region of the channel are positioned further away from the central axis than the inner walls of the inlet conduit in a region of the inlet conduit arranged upstream of the inlet end of the VID. A tenth example of the compressor optionally includes one or more of the first through ninth examples, and further includes a recirculation passage formed by an outer casing of the compressor and surrounding the inlet conduit, the recirculation passage fluidly coupled with the inlet conduit via a bleed port and a recirculation port, the bleed port formed in a wall of the inlet conduit downstream of a leading edge of the impeller and the recirculation port formed in the wall of the inlet conduit upstream of an inlet end of the VID.

As another embodiment, a method includes: in response to engine operation relative to a surge threshold of a compressor, adjusting a variable inlet device (VID) positioned in and across an inlet conduit of the compressor, upstream of an impeller, between an open position where an inner surface of the VID does not restrict flow through the VID, from an inlet end to outlet end of the VID, and a closed position where the inner surface narrows along a length of the VID and generates swirl flow at the outlet end of the VID. In a first example of the method, wherein the VID includes a plurality of adjacently arranged blades forming a ring around a central axis of the compressor, where inner surfaces of the plurality of adjacently arranged blades form the inner surface of the VID and a flow passage through the VID, and wherein each blade of the plurality of adjacently arranged blades includes an inlet end and an outlet end, the inlet end and arranged upstream from the outlet end in the inlet conduit. A second example of the method optionally includes the first example, and further includes wherein adjusting the VID between the open position and closed position includes adjusting the VID from the open position to the closed position in response to an engine in which the compressor is installed transitioning to operating at an engine speed and engine load that is below the surge threshold and wherein adjusting the VID from the open position to the closed position includes pivoting each blade so that the outlet end of each blade pivots toward the central axis. A third example of the method optionally includes one or more of the first and second examples, and further includes wherein adjusting the VID between the open position and closed position includes adjusting the VID from the closed position to the open position in response to an engine in which the compressor is installed transitioning to operating at an engine speed and engine load that is above the surge threshold and wherein adjusting the VID from the closed position to the open position includes pivoting each blade so that the outlet end of each blade pivots away from the central axis and toward an inner wall of the inlet conduit, where pivoting each blade away from the central axis includes decreasing overlapping of the plurality of adjacently arranged blades at the outlet end of the VID and increasing a diameter of the outlet end of the VID. A fourth example of the method optionally includes one or more of the first through third examples, and further includes wherein adjusting the VID between the open position and the closed position includes passively adjusting the VID between the open position and closed position via an actuation port arranged in a wall of the inlet conduit, between the inlet conduit and a recirculation passage surrounding the inlet conduit and in fluid communication with the inlet conduit, upstream of the VID and downstream of a leading edge of the impeller, where the actuation port is positioned between the inlet end and outlet end of the VID, adjacent to outer surfaces of the plurality of adjacently arranged blades.

As yet another embodiment, a system for an engine includes: a compressor including an impeller rotatable about a central axis and a variable inlet device arranged upstream of the impeller in an inlet conduit of the compressor, the VID comprising: a plurality of blades arranged adjacent to one another to form a ring with an inlet end and outlet end, the inlet end arranged upstream in the inlet conduit from the outlet end, where the plurality of blades are pivotable, from the inlet end to outlet end, relative to the central axis; and a controller including computer readable instructions stored on memory for: in response to operation of the engine below a surge threshold of the compressor, adjusting the VID into a closed position where the plurality of blades are overlapping one another at the outlet end and inner surfaces of the plurality of blades form a narrowing, from inlet to outlet end, smooth surface with a plurality of spiral grooves arranged around the ring; and in response to operation of the engine above the surge threshold, adjusting the VID into an open position where the plurality of blades are not overlapping one another at the outlet end and inner surfaces of the plurality of blades form a gradually widening, from inlet to outlet end, smooth surface without the plurality of spiral grooves. In a first example of the system, the system further comprises a recirculation passage formed by an outer casing of the compressor and surrounding the inlet conduit, the recirculation passage fluidly coupled with the inlet conduit via a bleed port and a recirculation port, the bleed port formed in a wall of the inlet conduit downstream of a leading edge of the impeller and the recirculation port formed in the wall of the inlet conduit upstream of the inlet end of the VID. A second example of the system optionally includes the first example, and further includes wherein in the closed position outlet ends of the plurality of blades contact an inner wall of the inlet conduit and in the open position inlet ends of the plurality of blades contact the inner wall of the inlet conduit. A third example of the system optionally includes one or more of the first and second examples, and further includes wherein a diameter of the outlet end of the VID is narrower in the closed position than in the open position and wherein each spiral groove of the plurality of spiral grooves is formed by overlapping side surfaces of two adjacent blades of the plurality of blades.

In another representation, a method comprises: in response to a current engine speed and engine load operating point of an engine, adjusting a variable inlet device (VID) positioned in and across an inlet conduit of the compressor, upstream of an impeller, between an open position where an inner surface of the VID does not restrict flow through the VID, from an inlet end to outlet end of the VID, and a closed position where the inner surface narrows along a length of the VID and generates swirl flow at the outlet end of the VID, while recirculating air flow from the impeller to a point upstream of the VID in the inlet conduit. In one example, recirculating air flow from the impeller to the point upstream of the VID in the inlet conduit includes recirculating air flow via a recirculation passage formed by an outer casing of the compressor and surrounding the inlet conduit.

In yet another representation, a compressor comprises an impeller rotatable in a first direction about a central axis; and an inlet conduit including a variable inlet device (VID) positioned therein, upstream of the impeller, and including a plurality of adjacently arranged blades forming a ring around the central axis with inner surfaces of the blades forming a flow passage through the VID, each of the blades being pivotable, about an axis arranged tangent to the ring, between an open and closed position, where the inner surfaces form a smooth surface including a plurality of grooves in the closed position, where a direction of curvature of the plurality of grooves is oriented to rotate flow through flow passage in the first direction.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A compressor, comprising:
   an impeller rotatable about a central axis; and
   an inlet conduit including a variable inlet device (VID) positioned therein, upstream of the impeller, and including a plurality of adjacently arranged blades forming a ring around the central axis with inner surfaces of the blades forming a flow passage through the VID, each of the blades being pivotable, about an axis arranged tangent to the ring, between an open and closed position; and
   a recirculation passage formed by an outer casing of the compressor and surrounding the inlet conduit, the recirculation passage fluidly coupled with the inlet conduit via a bleed port and a recirculation port, the bleed port formed in a wall of the inlet conduit downstream of a leading edge of the impeller and the recirculation port formed in a wall of the inlet conduit upstream of an inlet end of the VID, the passage further including an actuation port that fluidly couples the recirculation passage to the inlet conduit at a position directly adjacent to the plurality of blades.

2. The compressor of claim 1, wherein each blade of the plurality of blades includes an inlet end and an outlet end, the inlet end arranged upstream of the outlet end, and wherein the flow passage is formed within the inner surfaces of the blades, between the inlet end and the outlet end of each blade.

3. The compressor of claim 2, wherein each blade includes side surfaces extending between the inlet end and the outlet end and wherein, for each blade, a first side surface of the side surfaces contacts a side surface of a first adjacent blade and a second side surface of the side surfaces contacts a side surface of a second adjacent blade.

4. The compressor of claim 2, wherein an inlet end of the VID is formed by the inlet end of each blade and an outlet end of the VID is formed by the outlet end of each blade and wherein in the closed position the inlet end of the VID has a larger diameter than the outlet end of the VID.

5. The compressor of claim 4, wherein outlet ends of adjacent blades of the plurality of blades overlap more than inlet ends of adjacent blades of the plurality of blades in the closed position.

6. The compressor of claim 4, wherein in the open position, each of the inlet end of the VID and the outlet end of the VID have a larger diameter than the outlet end of the VID in the closed position and wherein a difference in diameter between the inlet end and the outlet end of the VID in the open position is decreased relative to the closed position.

7. The compressor of claim 2, wherein, in the closed position, the outlet end of each blade is positioned closer to the central axis than the inlet end of each blade and the inlet end of each blade is positioned proximate to an inner wall of the inlet conduit.

8. The compressor of claim 1, wherein, in the closed position, the inner surfaces of the blades are angled relative to flow through the inlet conduit and form a smooth surface with a plurality of spiral grooves facing the flow, where the blades are angled inward toward the central axis from an inlet end to an outlet end of the VID, the outlet end arranged downstream in the inlet conduit from the inlet end and wherein the plurality of spiral grooves is formed by overlapping inner surfaces of the blades.

9. The compressor of claim 1, further comprising a channel arranged in the inlet conduit, upstream of the impeller and downstream of an inlet end of the VID, where the channel extends outward from the central axis so inner walls of the inlet conduit in a region of the channel are positioned further away from the central axis than inner walls of the inlet conduit in a region of the inlet conduit arranged upstream of the inlet end of the VID.

10. A method, comprising:
   in response to engine operation relative to a surge threshold of a compressor, adjusting a variable inlet device (VID) positioned in and across an inlet conduit of the compressor, upstream of an impeller, between an open position where an inner surface of the VID does not restrict flow through the VID, from an inlet end to an outlet end of the VID, and a closed position where the inner surface narrows along a length of the VID and generates swirl flow at the outlet end of the VID, wherein the VID includes a plurality of adjacently arranged blades forming a ring around a central axis of the compressor, where inner surfaces of the plurality of adjacently arranged blades form the inner surface of the VID and a flow passage through the VID, and wherein each blade of the plurality of adjacently arranged blades includes an inlet end and an outlet end, the inlet end arranged upstream from the outlet end in the inlet conduit, wherein adjusting the VID between the open position and the closed position includes passively adjusting the VID between the open position and the closed position via an actuation port arranged in a wall of the inlet conduit, between the inlet conduit and a recirculation passage surrounding the inlet conduit and in fluid communication with the inlet conduit, upstream of the VID and downstream of a leading edge of the impeller, where the actuation port is positioned between the inlet end and the outlet end of the VID, adjacent to outer surfaces of the plurality of adjacently arranged blades.

11. A system for an engine, comprising:
a compressor including an impeller rotatable about a central axis and a variable inlet device (VID) arranged upstream of the impeller in an inlet conduit of the compressor, the VID comprising:
  a plurality of blades arranged adjacent to one another to form a ring with an inlet end and an outlet end, the inlet end arranged upstream in the inlet conduit from the outlet end, where the plurality of blades is pivotable, from the inlet end to the outlet end, relative to the central axis; and
a controller including computer readable instructions stored on memory for:
  in response to operation of the engine below a surge threshold of the compressor, adjusting the VID into a closed position where the plurality of blades overlap one another at the outlet end and inner surfaces of the plurality of blades form a narrowing, from the inlet end to the outlet end, smooth surface with a plurality of spiral grooves arranged around the ring; and
  in response to operation of the engine above the surge threshold, adjusting the VID into an open position where the plurality of blades is not overlapping one another at the outlet end and inner surfaces of the plurality of blades form a gradually widening, from the inlet end to the outlet end, smooth surface without the plurality of spiral grooves.

12. The system of claim 11, further comprising a recirculation passage formed by an outer casing of the compressor and surrounding the inlet conduit, the recirculation passage fluidly coupled with the inlet conduit via a bleed port and a recirculation port, the bleed port formed in a wall of the inlet conduit downstream of a leading edge of the impeller and the recirculation port formed in a wall of the inlet conduit upstream of the inlet end of the VID.

13. The system of claim 11, wherein, in the closed position, inlet ends and outlet ends of the plurality of blades contact an inner wall of the inlet conduit and, in the open position, inlet ends of the plurality of blades contact the inner wall of the inlet conduit.

14. The system of claim 11, wherein a diameter of the outlet end of the VID is narrower in the closed position than in the open position and wherein each spiral groove of the plurality of spiral grooves is formed by overlapping side surfaces of two adjacent blades of the plurality of blades.

* * * * *